(12) United States Patent
Hirayama

(10) Patent No.: US 7,904,616 B2
(45) Date of Patent: *Mar. 8, 2011

(54) STORAGE APPARATUS AND DATA TRANSFER METHOD

(75) Inventor: Hiroshi Hirayama, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/833,449

(22) Filed: Jul. 9, 2010

(65) Prior Publication Data

US 2010/0274935 A1 Oct. 28, 2010

Related U.S. Application Data

(63) Continuation of application No. 12/175,763, filed on Jul. 18, 2008, now Pat. No. 7,769,921.

(30) Foreign Application Priority Data

Apr. 28, 2008 (JP) ................................. 2008-117634

(51) Int. Cl.
G06F 3/00 (2006.01)
G06F 13/00 (2006.01)

(52) U.S. Cl. .............. 710/36; 710/74; 711/114; 361/600

(58) Field of Classification Search ................ 710/8–11, 710/36–45, 72–74; 711/113–114; 361/600, 361/679, 683, 685
See application file for complete search history.

(56) References Cited

U.S. PATENT DOCUMENTS

| | | | |
|---|---|---|---|
| 5,627,990 A | 5/1997 | Cord et al. | |
| 5,787,304 A | 7/1998 | Hodges et al. | |
| 6,157,962 A | 12/2000 | Hodges et al. | |
| 6,950,920 B1 | 9/2005 | Mizuno et al. | |
| 7,124,244 B2 | 10/2006 | Shimada | |
| 7,284,073 B2 | 10/2007 | Matsushige et al. | |
| 7,493,432 B2 | 2/2009 | Fukazawa et al. | |
| 7,603,485 B2 | 10/2009 | Komikado et al. | |
| 7,769,921 B2 * | 8/2010 | Hirayama | ................ 710/36 |
| 2002/0099901 A1 | 7/2002 | Tanaka et al. | |
| 2005/0021907 A1 | 1/2005 | Shimada | |
| 2008/0126581 A1 | 5/2008 | Komikado et al. | |

FOREIGN PATENT DOCUMENTS

JP 11-313069 11/1999
JP 2005-044010 2/2005

* cited by examiner

Primary Examiner — Christopher B Shin
(74) Attorney, Agent, or Firm — Antonelli, Terry, Stout & Kraus, LLP.

(57) ABSTRACT

A storage method including: controlling transfer of data between a host system and a storage device using a plurality of controllers connected to the host system and the storage device, where the controllers are interconnected via a data transfer path; and controlling the controllers using a plurality of processors connected to the controllers, wherein each of the plurality of controllers is connected to the same or a different processor; and wherein a first processor connected to a controller that received a transfer command from the host system creates, as header information of a packet of a first controller to become a transfer source: identifying information of the first controller and a second controller to become a transfer destination, identifying information of the transfer path between the first controller and the second controller, and identifying information of a controller which is between first and second controller to be routed upon transferring the data.

2 Claims, 18 Drawing Sheets

FIG.12

EXPLANATION OF EACH CONFIGURATION BIT (EXCERPT)

| Completer ID | LSI# | CONTROLLER IDENTIFICATION NUMBER (0:CTL0, 1:CTL1, 2:CTL3, 3:CTL3) | TRANSFER DESTINATION IDENTIFICATION |
|---|---|---|---|
| Requester ID | Func. # | TRANSFER SOURCE IDENTIFICATION | 0x10 : BRGMP |
| | | 0x00 : BRGMP | 0x11 : BRG DUAL |
| | | 0x01 : BRG DUAL | 0x12 : BRG CROSS |
| | | 0x02 : BRG CROSS | 0x13 : HDMA(BRGH) |
| | | 0x03 : HDMA(BRGH) | 0x14 : DDMA(BRGD) |
| | | 0x04 : DDMA(BRGD) | 0x15 : MEMCTL |
| | | 0x05 : MEMCTL | |
| Route ID1 | R-LSI # | ROUTE CONTROLLER IDENTIFICATION NUMBER (0:CTL0, 1:CTL1, 2:CTL3, 3:CTL3, other:NO ROUTE) | |
| Route ID2 | R-Runc# | TRANSFER SOURCE I/O IN ROUTE CONTROLLER | |
| | | 0x01 : BRG DUAL | |
| | | 0x02 : BRG CROSS | |

STORAGE APPARATUS AND DATA TRANSFER METHOD

CROSS REFERENCE TO RELATED APPLICATION

This is a continuation of U.S. application Ser. No. 12/175,763, filed Jul. 18, 2008 now U.S. Pat. No. 7,769,921. This application relates to and claims priority from Japanese Patent Application No. 2008-117634, filed on Apr. 28, 2008. The entirety of the contents and subject matter of all of the above is incorporated herein by reference.

BACKGROUND

The present invention generally relates to a storage apparatus and its data transfer method, and in particular relates to a storage apparatus configured from a controller comprising individual I/Os (referring to data transfer paths; hereinafter the same) to a cache memory, a host, and an HDD (Hard Disk Drive), and its data transfer method.

Conventionally, a storage apparatus configures a host interface, a cache memory, and a drive interface connected to an HDD, a controller for controlling the data transfer, an I/O for connecting the foregoing components, and a microprocessor for controlling the overall system as a single unit (module), and connects a plurality of modules with a dedicated I/O. Each module has an independent power supply, and host transfer data is subject to storing to a cache memory of the other module in order to improve the reliability against data loss (for instance, refer to Japanese Patent Laid-Open Publication No. 2005-44010).

Meanwhile, there are cases where the storage apparatus is configured to expand hosts and HDD drives by connecting a plurality of modules. With data transfer through the I/O, there are cases where the I/O between modules to be routed can be selected even if the transfer source and the transfer destination are the same. Accordingly, with a storage apparatus, an optimal path selection (routing) is possible according to the transfer status and failure status of each I/O. As one example of a path selection method, Japanese Patent Laid-Open Publication No. H11-313069 discloses a method of selecting the optimal path by weighting in accordance with the usage status in the connection of nodes; that is, the connection of controllers, and selecting the optimal path from the weighted sum between the nodes included between the transfer source and the transfer destination.

SUMMARY

A storage apparatus deals with scalability by increasing the number of I/Os with the host or the number of I/Os with the HDD drive. Thus, a storage apparatus deals with scalability by adding the number of I/Os with the host and number of I/Os with the HDD drive of the controller controlling the data transfer. Nevertheless, the reading and writing performed in the storage apparatus are simultaneously transferred with a plurality of I/Os. Thus, in a storage apparatus, in proportion to the increase in the number of I/Os, it is necessary to improve performance of the I/O switch (switch band), cache read and write operation to be performed in the controller. In particular, when configuring a large-scale storage apparatus, it is difficult to have the switch band and cache band for the required number of I/Os. In other words, with a storage apparatus, it is difficult to realize devices such as a controller comprising the required band.

Thus, with a storage apparatus, four or eight modules are connected by adding I/Os between modules for connecting the controllers in order to deal with scalability. In other words, a storage apparatus deals with scalability based on a multi controller architecture. Each controller comprises the switch band and cache band required for the number of I/Os, and it is thereby possible to have the number of I/Os required in a storage apparatus while having the transfer rate to the interface.

A multi controller architecture is not limited to cases where the I/O of the transfer destination and the I/O of the transfer source are contained in the same controller, and there are cases where they are contained in each controllers. In this case, data transfer is performed via an I/O between modules provided between the controllers. With a storage apparatus, there are cases when a plurality of transfer paths exist when transferring data via a plurality of controllers. Meanwhile, the inter-module I/O between controllers causes deterioration in the transfer rate due to a transfer failure or the transfer from a plurality of controllers being concentrated on the same I/O. With a storage apparatus, it is desirable to avoid this kind of I/O and select the optimal path for transfer.

As an example of path selection, Japanese Patent Laid-Open Publication No. H11-313069 discloses a method of calculating the weighted sum and performing path selection while consolidating the weighting between all nodes. Here, a node corresponds to a controller in the storage apparatus or an I/O between the controllers. There are the following problems when applying this method to a storage apparatus having a multi controller architecture.

Specifically, weighting that gives consideration to the occurrence of a failure in the interface is required. Moreover, since the weight of each node will change by the minute due to variation in the number of I/Os with the host or the number of I/Os with the HDD drive subject to a transfer, path determination during the transfer must also be performed in addition to the path selection before the transfer.

In addition, with an actual storage apparatus, the number of controllers in relation to one control means (microprocessor or the like) is limited in order to avoid deterioration in the transfer performance caused by the deficiency in the processing performance of the control means. Although the management of failures that occur during the transfer is desirably concentrated in a single control means, this is impossible with the foregoing storage apparatus. Accordingly, transfer path selection giving consideration to the management of failures in a storage apparatus having a multi controller architecture is required.

Furthermore, when deciding the transfer path based on the failure status and transfer status as weighting factors, and the number of controllers to be managed by the control means, it is necessary to perform weighting with each factor upon selecting the optimal transfer path.

The present invention was devised in view of the foregoing points. Thus, an object of the resent invention is to propose a storage apparatus and its data transfer method capable of improving access performance.

In order to achieve the foregoing object, the present invention provides a storage apparatus including a plurality of controllers connected to a host system and a storage device and for controlling transfer of data with the host system and the storage device, a transfer path of data for connecting the controllers, and a plurality of processors connected to the controllers and for controlling the controllers. Each of the plurality of controllers is connected to the same or a different processor. A first processor connected to a controller that received a transfer command from the host system determines, based on the transfer command, a first controller to become a transfer source of data and a second controller to become a transfer destination of the data, and determines a path belonging to the transfer path between the first controller and second controller. If there are a plurality of paths, a second processor connected to the second controller selects a path in which the number of controllers connected other than to the second controller becomes maximum as a specific path, and the plurality of processors transfer data between the first controller and the second controller in line with the specific path.

The present invention additionally provides a storage apparatus including a plurality of controllers connected to a host system and a storage device and for controlling transfer of data with the host system and the storage device, a transfer path of data for connecting the controllers, and a plurality of processors connected to the controllers and for controlling the controllers. Each of the plurality of controllers is connected to the same or a different processor. A first processor connected to a controller that received a transfer command from the host system creates, as header information of a packet of a first controller to become a transfer source, identifying information of the first controller and a second controller to become a transfer destination, identifying information of the transfer path between the first controller and the second controller, and identifying information of a controller to be routed upon transferring the data.

The present invention further provides a data transfer method of a storage apparatus including a plurality of controllers connected to a host system and a storage device and for controlling transfer of data with the host system and the storage device, a transfer path of data for connecting the controllers, and a plurality of processors connected to the controllers and for controlling the controllers. Each of the plurality of controllers is connected to the same or a different processor. A first processor connected to a controller that received a transfer command from the host system determines, based on the transfer command, a first controller to become a transfer source of data and a second controller to become a transfer destination of the data, and determines a path belonging to the transfer path between the first controller and second controller. If there are a plurality of paths, a second processor connected to the second controller selects a path in which the number of controllers connected other than to the second controller becomes maximum as a specific path, and the plurality of processors transfer data between the first controller and the second controller in line with the specific path.

Accordingly, if a plurality of paths can be selected for the data transfer from a transfer source to a transfer destination in a storage apparatus having a multi controller architecture, since such selection can be made appropriately, it is possible to efficiently access the intended data.

According to the present invention, it is possible to realize a storage apparatus and its data transfer method capable of improving access performance.

DESCRIPTION OF DRAWINGS

FIG. 12 is an explanatory diagram of a packet format to be used in data transfer in a controller and between controllers;

DETAILED DESCRIPTION

An embodiment of the present invention is now explained in detail with reference to the attached drawings. This invention, however, shall not be limited to the following embodiments.

(1) First Embodiment

Figure 1:
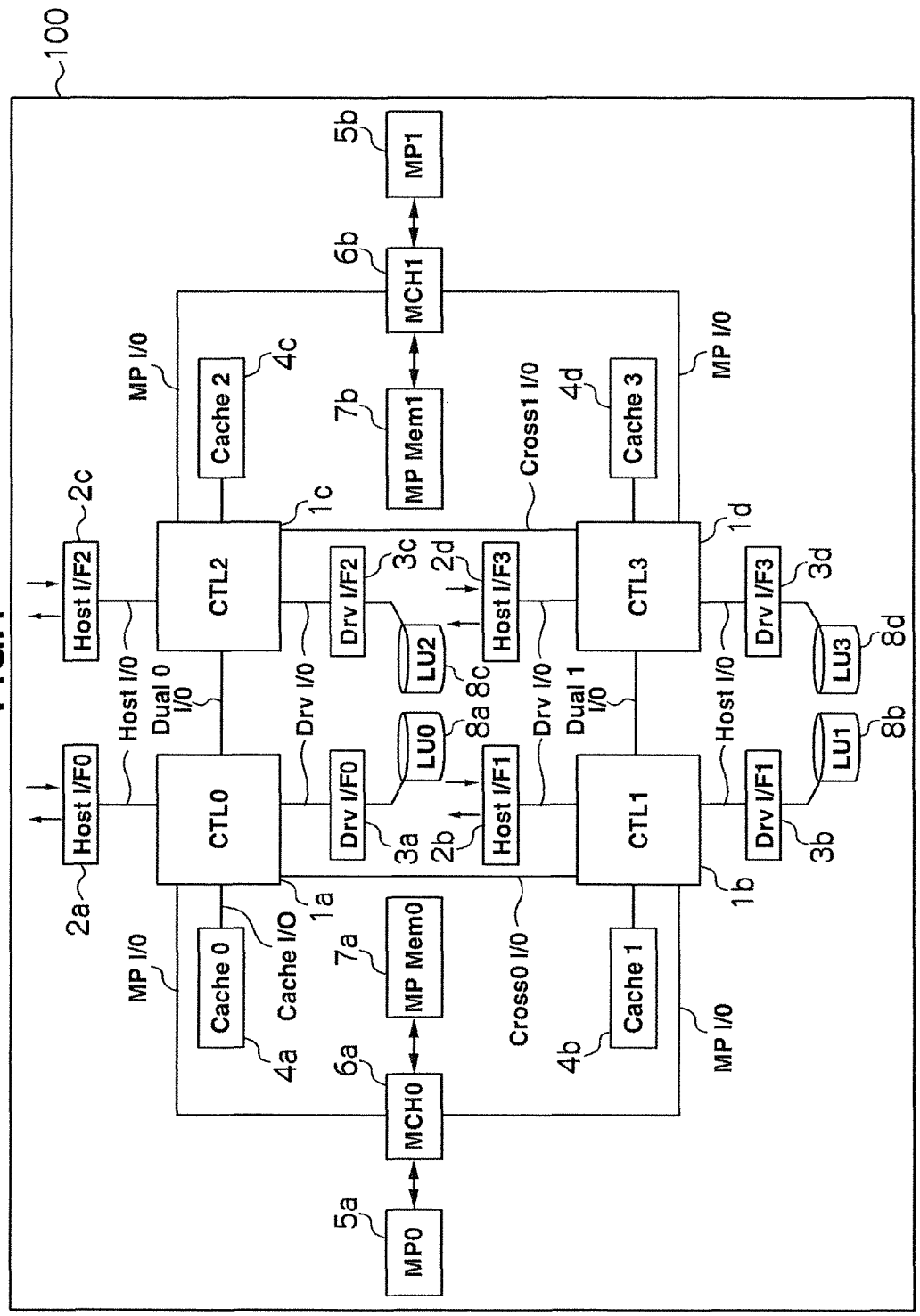
FIG. 1 is a configuration diagram of a storage apparatus to which the present invention is applied.

FIG. 1 is an apparatus block diagram showing a first embodiment of a storage apparatus 100 according to the present invention. In FIG. 1, a controller 1 (1a to 1d) (CTL 0 to CTL 3) is a controller for controlling the data transfer via the respective I/Os (referring to the data transfer paths; hereinafter the same) among a cache memory 4 (4a to 4d) (Cache 0 to Cache 3), a host interface 2 (2a to 2d) (Host I/F 0 to Host I/F 3), a drive interface 3 (3a to 3d) (Dry I/F 0 to Dry I/F 3), and a microprocessor 5 (5a, 5b) (MP0, MP1). The controllers 1 are connected each other with an I/O (Dual I/O, Cross I/O).

In FIG. 1, the controller 1a and the controller 1b are connected with a cross 0 I/O (Cross 0 I/O), the controller 1a and the controller 1c are connected with a dual 0 I/O (Dual 0 I/O), the controller 1b and the controller 1c are connected with a cross 1 I/O (Cross 1 I/O), and the controller 1b and the controller 1d are connected with a dual 1 I/O (Dual 1 I/O), thereby configuring loop-shaped architecture. Differences of using the dual I/O and the cross I/O will be explained later with reference to FIG. 4 and FIG. 5.

The host interfaces 2a to 2d are host interfaces that control the data transfer in packet units according to a communication protocol with the host. The drive interfaces 3a to 3d are drive interfaces that control the data transfer in sector units according to a communication protocol with the hard disk drive.

The storage apparatus 100 of the present invention also comprises cache memories 4a to 4d for temporarily storing the transfer data from the host interfaces 2a to 2d and the drive interfaces 3a to 3d. By cache memories 4a to 4d, it is possible to prevent the loss of host transfer data during the writing of data into the drive and improve the host read performance based on a cache hit. Hard disk drives are connected to the drive interfaces 3a to 3d, and logical volumes 8a to 8d (LU0 to LU3, LU: Logical Unit) as access space are also allocated.

The microprocessors 5a, 5b are control means of the respective controllers 1a to 1d, host interfaces 2a to 2d, and drive interfaces 3a to 3d. The microprocessors 5a, 5b are connected to the controllers 1a to 1d and the processor memories 7a, 7b (MP Mem 0, MP Mem 1) via the memory controller hubs 6a, 6b (Memory Controller Hub: MCH). For instance, the memory controller hub 6a is connected to the controller 1a (CTL 0) and the controller 1b (CTL 1), and the microprocessor 5a directly controls the controller 1a, the controller 1b, the host interface 2a, the host interface 2b, the drive interface 3a, and the drive interface 3b. The memory controller hubs 6a and 6b are connected to the controllers 1a, 1b and the controllers 1c, 1d with an MP I/O (MP I/O). The storage apparatus 100 is configured from the foregoing elements.

Figure 2:
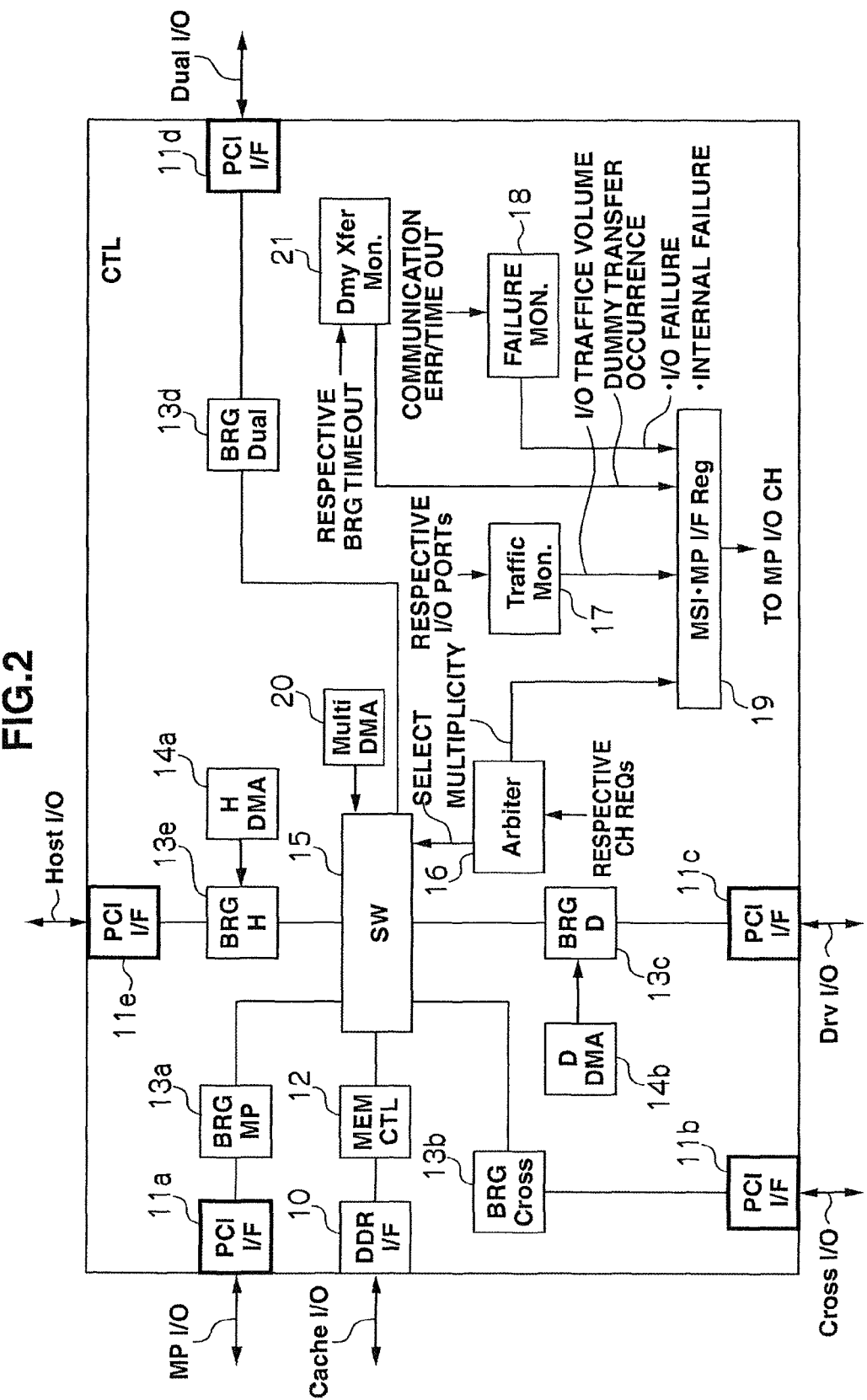
FIG. 2 is an internal configuration diagram of a controller configuring the storage apparatus.

The internal configuration of the controllers 1a to 1d is now explained. FIG. 2 is a block diagram of the controllers 1a to 1d. In FIG. 2, as a data transfer method via the respective I/Os (MP I/O, cross I/O, host I/O (Host I/O), drive I/O (Dry I/O), dual I/O) connected to the controller 1, for instance, PCI Express (PCI-Express) as a high-speed serial bus standard is adopted.

The DDR I/F 10 controls the data transfer between the cache memory 4 and the controller 1. In this case, a high-speed memory, for example DDR (Double Data Rate Synchronous DRAM) is used as the cache memory 4. The DDR I/F 10 and the cache memory 4 are connected with a cache I/O.

The PCI I/Fs 11a to 11e (PCI I/F) control the data transfer according to a communication protocol in the respective layers of a physical layer, a link layer, and a transaction layer. The data transfer at the transaction layer is conducted in packet units according to a TLP (Transaction Layer Packet) format.

The memory controller 12 (MEM CTL) controls the issue of various commands for DRAM such as the read, write and RMW (Read Modify Write) to the cache memory, and the refresh operation. The memory controller 12 is connected to an internal high-speed switch (SW) 15.

Each bridge circuit 13a to 13e (BRG MP, BRG Cross, BRG D, BRG Dual, BRG D) is connected to the internal high-speed switch 15, and is a bridge circuit including a reception buffer and send buffer of the transferred TLP. As a result of being equipped with a buffer, the bridge circuits 13a to 13e are able to retain and rewrite the header information configuring the TLP, and also comprise the packet conversion function suitable for the TLP transfer in the controller 1 and between the controllers 1. This will be explained later with reference to FIG. 8 to FIG. 13.

The DMA circuits 14a, 14b (D DMA, H DMA) are connected to the bridge circuit 13e (BRG H) and the bridge circuit 13c (BRG D), and control the transfer operation as the requester via each I/O of the transfer source. The DMA circuit 20 (Multi DMA) controls the transfer with the microprocessor 5 and the cache memory 4 via each I/O.

The high-speed switch 15 multiplexes and transfers the TLP via the respective I/Os according to an arbiter 16 if there is a TLP transfer request (REQ) to the same I/O via different I/Os.

The arbiter 16 creates I/O selection commands according to a predetermined priority in response to simultaneously TLP transfer requests (REQ). The arbiter 16 also detects the TLP multiplicity on the transfer destination I/O from the number of simultaneously TLP transfer requests (REQ), or from the number of transfer I/Os that created a TLP transfer request (REQ) within a period and the number of TLP transfer requests (REQ) within a period.

A traffic monitor 17 (Traffic Mon.) calculates the traffic volume by measuring the occupancy time of the TLP transfer on the I/O of the transfer destination within a period. The traffic monitor 17 measures, for example, the time connected to the output I/O via the transfer source I/O. Measurement is realized by using a selection signal created in the arbiter 16, or equipping the high-speed switch 15 with a status detection function that synchronizes the period of TLP transfer through the transfer destination I/O and shows the transfer status.

A dummy transfer monitor 21 (Dmy Xfer Mon.) is a function for detecting the transfer involving dummy data. The transfer with dummy data is the transfer (discharge) as a result of the received TLP data amount not satisfying the reception buffer size and not being able to receive data for a given time thereafter, and dummy data is added to satisfy the reception buffer size.

A failure monitor 18 (failure Mon.) comprises a function of detecting failures in the I/O (dual I/O and cross I/O). Examples of an I/O failure includes a reply (completion status) timeout upon performing Non-Posted TLP transfer, or a case of the receiving side detecting an error in the parity added during the PCI Express transfer.

MSI.MP I/F register 19 reflects the multiplicity, traffic volume, and dummy data transfer detected in the respective monitors 17, 18, 21 as well as the detection of failures, and transfers this to the microprocessors 5a, 5b and the processor memories 7a, 7b via the MP I/O.

Figure 3:
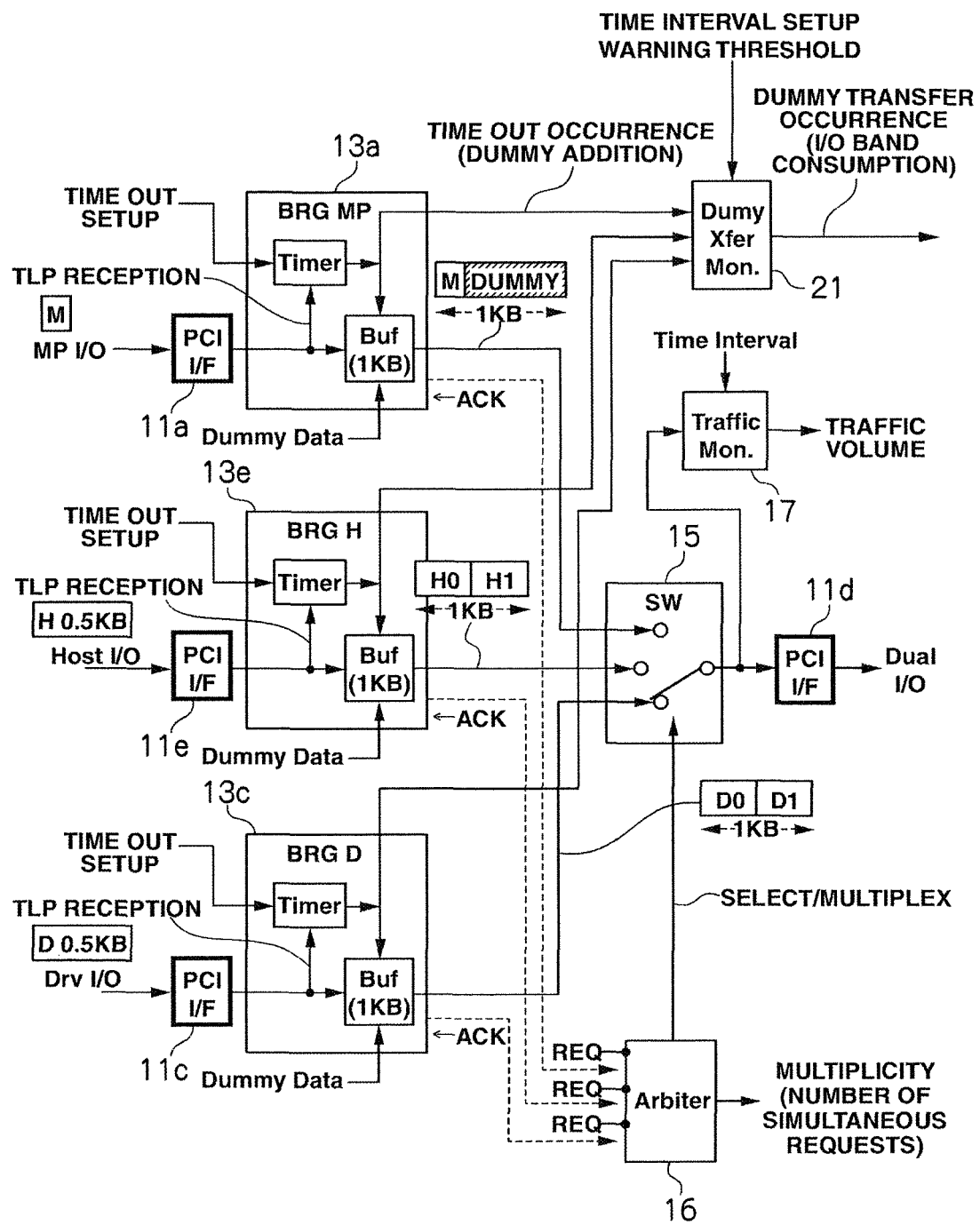
FIG. 3 is an explanatory diagram of multiplicity, traffic volume, and dummy transfer detection of I/O ports.

Examples of the foregoing multiplicity, traffic volume, and dummy data transfer detection are now explained. FIG. 3 shows the TLP transfer and multiplexing to the destination I/O (Dual I/O) via the respective transfer source I/Os (MP I/O, Host I/O, Dry I/O).

The bridge circuits 13a, 13c, 13e (BRG MP, BRG H, BRG D) of the transfer source I/Os (MP I/O, Host I/O, Dry I/O) are configured from a buffer for storing the received TLP, and a timer for measuring the TLP reception interval. The buffer capacity comprises, for instance, twice (1024 Byte, 1 KB) of the 512 Byte of the access unit (sector) of the hard disk drives. A buffer is used for minimizing the overhead upon multiplexing with other I/Os on the high-speed switch 15, and is provided for continuing the TLP transfer of an I/O during the another transfer via a separate I/O.

The bridge circuits 13a, 13c, 13e of the transfer source I/O are configured for the TLP transfer from access in several byte units of the register access to several KB of the data. The bridge circuits 13a, 13c, 13e start up the timer at the timing of receiving the TLP, and measure the time interval until the subsequent TLP received. If the bridge circuits 13a, 13c, 13e detect a timeout, they force to satisfy the buffer capacity of 1 KB by adding dummy data to the received TLP, and transfer this to the high-speed switch 15. The bridge circuits 13a, 13c, 13e simultaneously output a TLP transfer request (REQ) to the arbiter 16. The arbiter 16 returns Acknowledge (ACK) to each bridge circuit 13a, 13c, 13e in the order that the TLP transfer request (REQ) is made. If the TLP transfer requests (REQ) are made simultaneously, the arbiter 16 returns ACK according to the priority. After receiving ACK, the bridge circuits 13a, 13c, 13e transfer the data in the buffer. The arbiter 16 multiplexes the TLP transferred to the high-speed switch 15 in the order that ACK was returned, and transmits this to the output I/O.

The arbiter 16 also detects the TLP multiplicity of the transfer destination I/O from the number of TLP transfer requests (REQ) that are made simultaneously, or from the number of transfer I/Os that created a TLP transfer request (REQ) within a period and the number of TLP transfer requests (REQ) that are made per period. The traffic monitor 17 calculates the traffic volume by measuring the occupancy time of the TLP transfer on the transfer destination I/O in given intervals. The dummy transfer monitor 21 is a function for detecting the transfer involving dummy data, and corresponds to the timeout detection of the timer configuring the bridge circuits 13a, 13c, 13e. The dummy transfer monitor 21 counts the timeout detection in a period and compares it with a threshold. The dummy transfer monitor 21 is able to detect wastage in the I/O band by measuring the frequency of the dummy data transfer in the comparison with the threshold.

Figure 4:
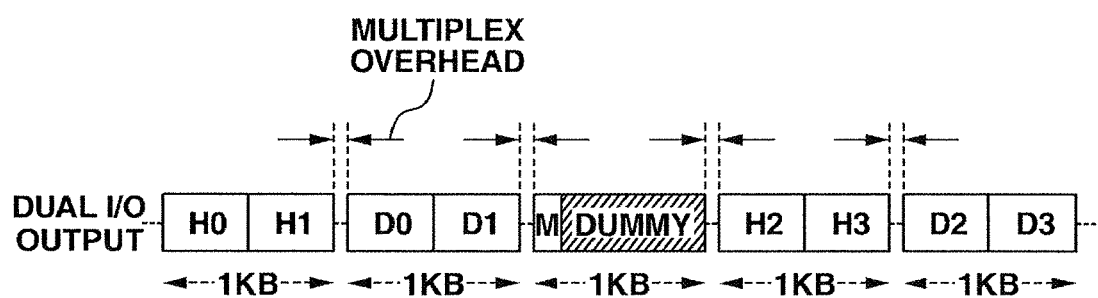
FIG. 4 is an explanatory diagram of multiplicity, traffic volume, and dummy transfer detection of I/O ports.

Wastage of the I/O band is now explained with reference to FIG. 4. FIG. 4 shows a case where the MP I/O receives a TLP with a small data amount, and the TLP is transferred together with dummy data e configuring the bridge circuits 13a, 13c, 13e. Although the dummy data is meaningless data in the transfer destination, wastage of the I/O band will occur since it exists as data on I/O. With the storage apparatus 100, wastage of the I/O band will increase and the deterioration in the transfer rate of the other I/Os will occur if dummy data transfer is frequent.

Although FIG. 4 illustrates an example using the MP I/O, transfer with dummy data will also occur if there is register access between the host interface 2 and the drive interface 3 connected to the host I/O and the drive I/O. Accordingly, in FIG. 3, all bridge circuits 13a, 13c, 13e comprise a timer and a dummy data addition function.

A method of sharing the respective statuses such as the detection of multiplicity, traffic volume, dummy data and failure is now explained. In this case, the microprocessor 5a (MP 0) acquires the status of the directly-controlled controllers 1a, 1b (CTL 0, CTL 1), host interfaces 2a, 2b (Host I/F 0, 1), and drive interfaces 3a, 3b (Dry I/F 0, 1) and accesses the control register based on the TLP transfer with the processor memory 7a (MP Mem 0) via the memory controller hub 6a (MCH 0) and the register access of the microprocessor (self system (CTL0/1) status). The microprocessor 5b (MP 1), as with the microprocessor 5a, acquires the status of the controllers 1c, 1d (CTL 2, CTL 3), the host interfaces 2c, 2d (Host I/F 2, 3), and the drive interfaces 3c, 3d (Dry I/F 2, 3) and updates the processor memory 7b (self system (CTL2/3) status).

Here, when viewed from a single microprocessor 5, the directly controllable controller 1, host interface 2, and drive interface 3 are defined as a "self system," and a controller on the other side with the dual I/O are defined as the "other system." For instance, in the microprocessor 5a, the controllers 1a, 1b are a "self system" and the controllers 1c, 1d are the "other system," and in the microprocessor 5b, the controllers 1c, 1d are a "self system" and the controllers 1a, 1b are the "other system."

Meanwhile, there are cases where each microprocessor 5 needs to acquire the status of controller 1 or I/O of the "other system." For example, this would be cases where the microprocessor 5a needs to acquire the status of the controller 1c or 1d, or access the host interfaces 2c, 2d and the drive interfaces 3c, 3d via the I/O.

In this case, the status is shared by the microprocessor 5a performing data transfer from the processor memory 7b of the "other system" to the processor memory 7a of the "self system" via the dual I/O. In addition, there may be cases that the microprocessor 5a directly accesses the register and I/O in the controllers 1c, 1d of the "other system." Here, with the storage apparatus 100, two types of transfer paths exist when sharing the status in the communication between the processor memories 7a, 7b. Thus, when transferring the status or the like from the processor memory 7b to the processor memory 7a, the microprocessor 5a selects the optimal dual I/O from the failure, multiplicity, traffic volume, and dummy data transfer detection in the dual I/O of the controllers 1c, 1d of the "other system."

Figure 6:
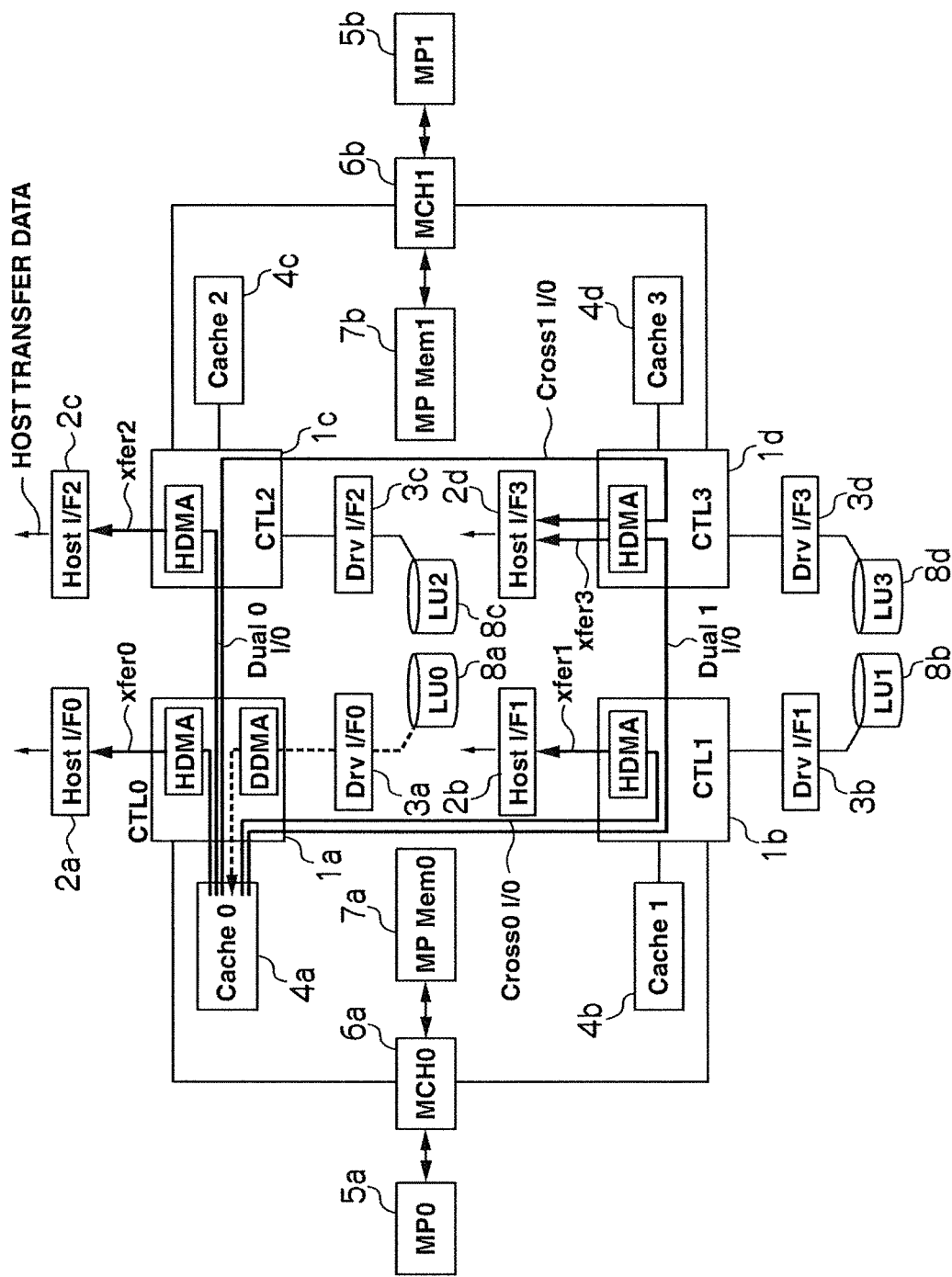
FIG. 6 is an explanatory diagram of a data transfer path in the storage apparatus.

Incidentally, the communication between the MSI.MP I/F register 19 and the microprocessor 5 is not limited to the communication via the MP I/O, and other cases may be considered where an interrupt signal to be directly connected to the microprocessor 5 with a hard wire or a dedicated register I/F bus is provided when using an MSI (Message Signaled Interrupt) (not shown) as the interrupt notice, this is transferred to the processor memory 7 as TLP via the MP I/O. The data transfer between the host and the HDD drive (LU 8a) to be performed is now explained. FIG. 6 shows, as one example of the data transfer (LU read) to the host, the data transfer path when the LU 8a (LU 0) is reproduced, store into the cache memory 4a (Cache 0), and transferred from the cache memory 4a to the respective host interfaces 2a to 2d (Host I/F 0-3). The storing of the LU 8a into the cache memory 4a is performed by the microprocessor 5a (MP 0) controlling the controller 1a (CTL 0) to which the LU 8a belongs starting up the DMA circuit 14b (D DMA).

After the storing of the LU 8a into the cache memory 4a, the microprocessor 5 controlling the respective controllers 1 starts up the DMA circuit 14a (H DMA) in the controller to which the transfer destination host interface 2 belongs, and thereby transfers the data of the LU 8a. FIG. 6 shows the transfer path (xfer0, xfer1, xfer2, xfer3) to the respective host interfaces 2. In FIG. 6, there is a plurality of transfer paths in a transfer (xfer3) in which the transfer source (cache memory 4a) and the controller 1d to which the transfer destination (Host I/F 3) belongs are not mutually adjacent. Here, the transfer path (xfer3) between the controllers 1 that are not connected in dual I/O or cross I/O is referred to as a "diagonal path." In FIG. 6, in the case of a diagonal path xfer3 via the controller 1c (CTL 2), the DMA circuit 14a (H DMA) of the transfer destination controller 1d (CTL 3) is started up, and the controllers 1c, 1d and data transfer are managed in the same microprocessor 5b (MP 1). Meanwhile, the controller 1a (cache memory 4a in which data of the LU 8a is stored) and the controller 1c are connected with a dual 0 I/O (Dual 0 I/O), and its I/O failure is managed with the transfer timeout of the received data on the controller 1c. Accordingly, comprehension of failures during the transfer can be consolidated in the microprocessor 5b. The storing of the LU 8a into the cache memory 4a is not limited to the example shown in FIG. 6, and, for example, such data may be transferred to the controller 1 to which the transfer destination host interface 3 belongs, and then stored into the cache memory 4 t. In this case also, as the transfer path from the LU 8a to the cache memory 4d, there is a path that routes the controller 1b or the controller 1c. The subject matter of the present invention is also applied to foregoing case.

Figure 7:
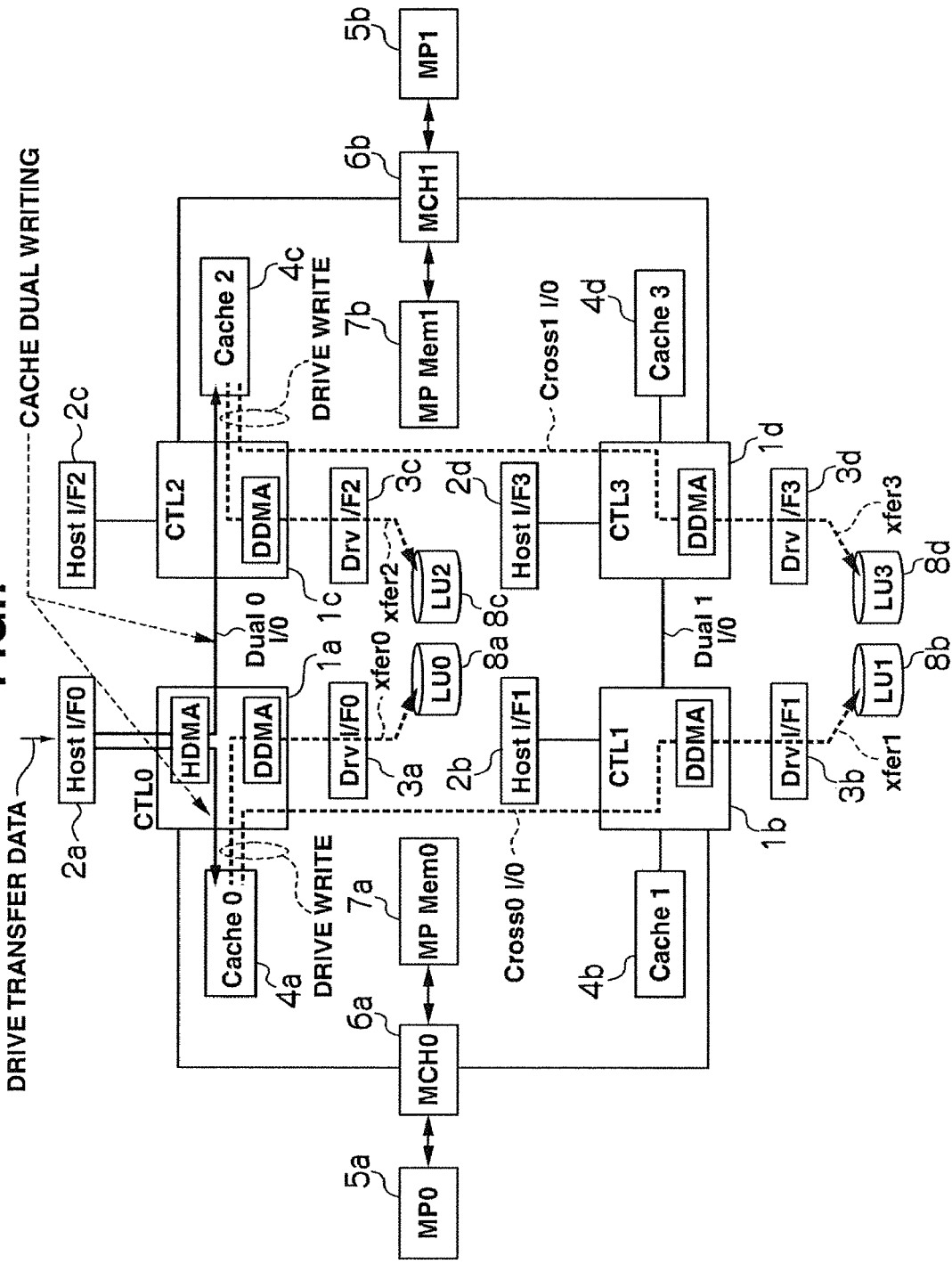
FIG. 7 is an explanatory diagram of a data transfer path in the storage apparatus.

FIG. 7 shows the data transfer (LU write) path from the host interface 2a to each LU 8. In FIG. 7, the received data of the host interface 2a is stored to the cache memory 4a of the affiliated controller 1a and the cache memory 4c of the controller 1c in a symmetrical location via the dual 0 I/O. With the storage apparatus 100, it is possible to avoid the loss of transfer data from the host based on above-cited method.

After the storing, the microprocessor 5a transfers the data to the drive interface 3a in which the target LU 8a exists so as to update the LU 8a. The microprocessor 5a controls the transfer with the DMA circuit 14b (D DMA) of the transfer destination controller 1a. The storing of data received from the host interface 2a to the cache memory 4 is not limited to FIG. 7, and may also be stored to the cache memory 4b, 4d.

Figure 5:
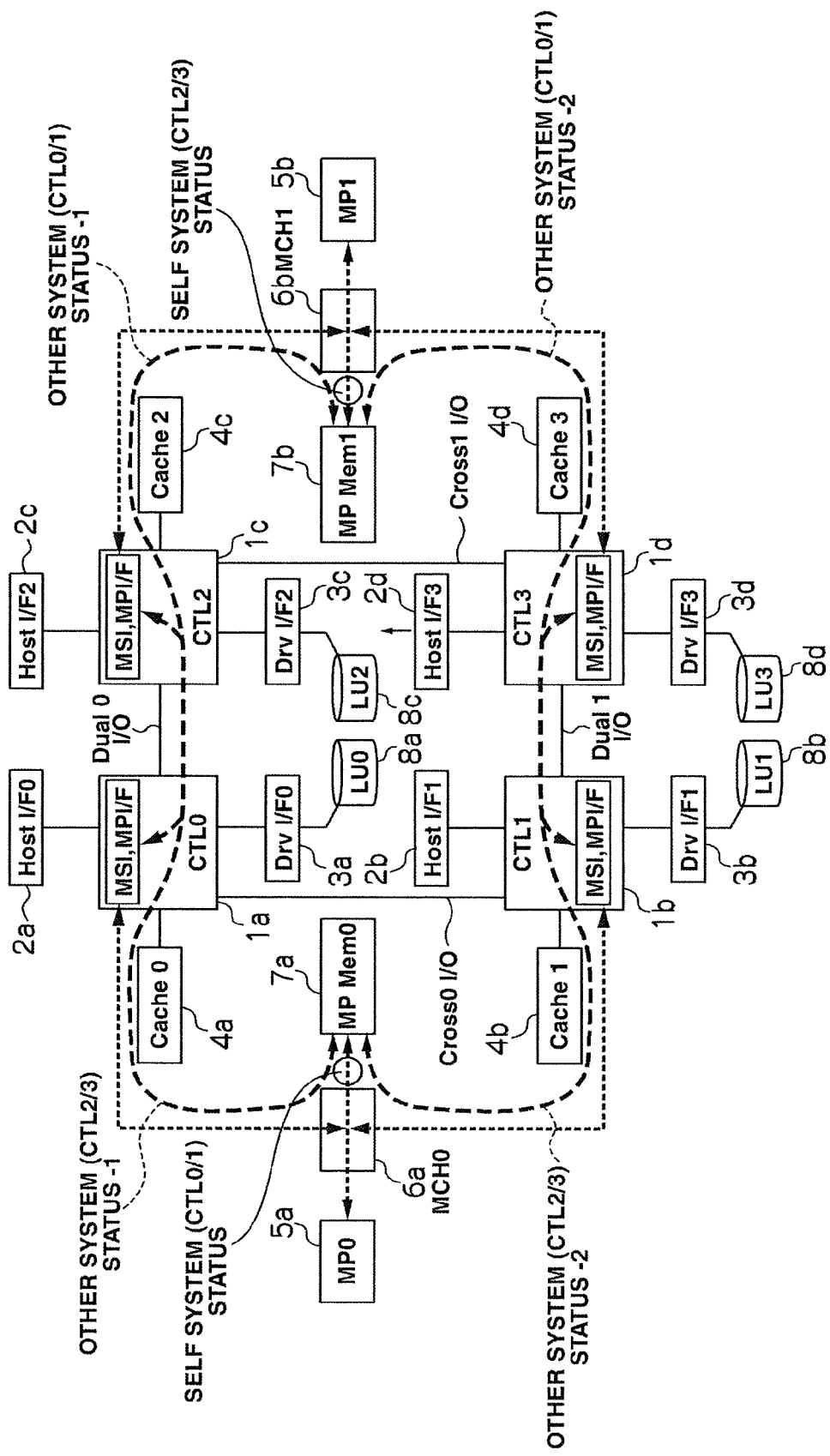
FIG. 5 is an explanatory diagram showing the allocation of controllers managed by the microprocessor in the storage apparatus and a status sharing method based on a processor memory.

I/O access that passes through the dual I/O or cross I/O is now explained with reference to FIG. 5 to FIG. 7. In the dual 0 I/O, dual 1 I/O, communication (FIG. 5) involving the sharing of the processing memory 7 of the "other system" and access to the register of the controller 1, the host interface 2, and the drive interface 3 of the "other system," the transfer data (FIG. 7) from the host, and the data transfer (FIG. 6) during the transfer to the host are multiplexed. In particular, since the register access of the microprocessor 5, the host interface 2, and the drive interface 3 involve the dummy data transfer explained in FIG. 4, in the dual I/O, the band is easily wasted due to the occurrence of such access. Meanwhile, the cross 0 I/O and cross 1 I/O do not entail the foregoing problems since they are used only in the data communication between the controllers 1.

The method of transfer performed between the controller 1 and the microprocessor 5 is now explained regarding the data transfer between the host and the LU 8 explained with reference to FIG. 6 and FIG. 7.

FIG. 8 to FIG. 12 are diagrams showing the TLP format to be applied only for the data transfer in the controller 1 or between the controllers 1 of FIG. 6 and FIG. 7. The TLP format is compliant to the TLP format of PCI Express, and is optimized for the TLP transfer in the controller 1 and between the controllers 1.

Figure 8:
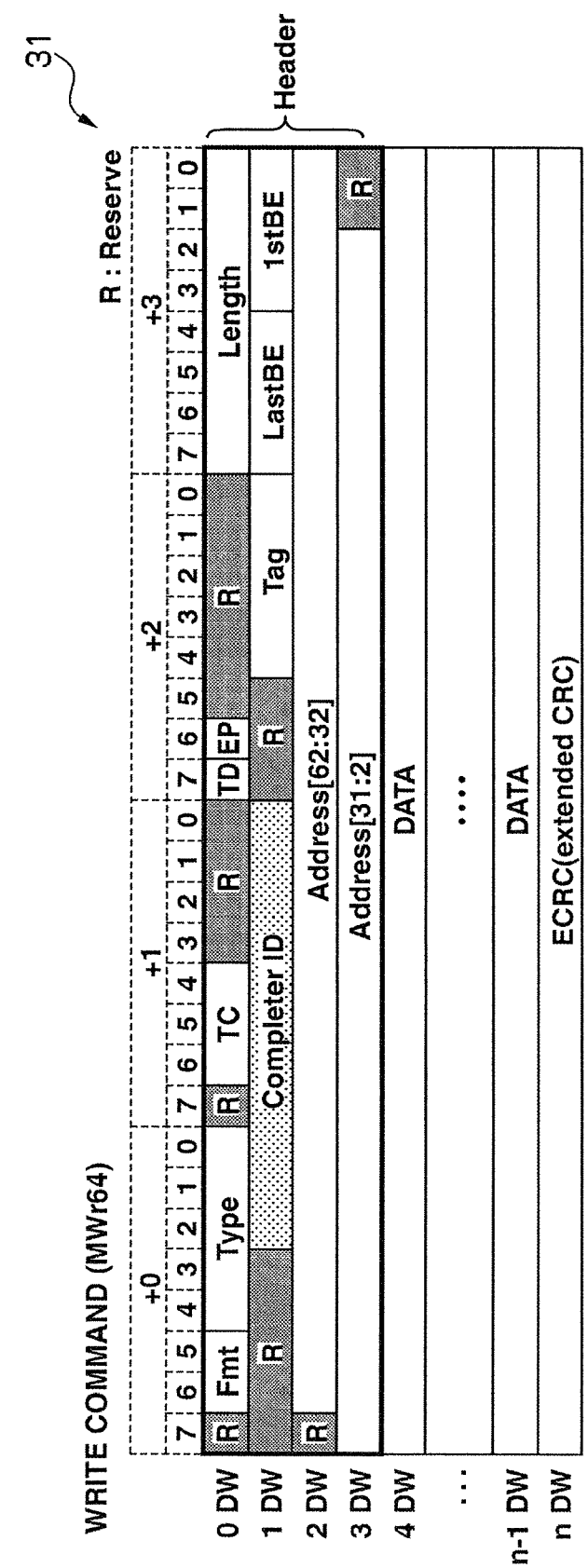
FIG. 8 is an explanatory diagram of a packet format to be used in data transfer in a controller and between controllers.
Figure 9:
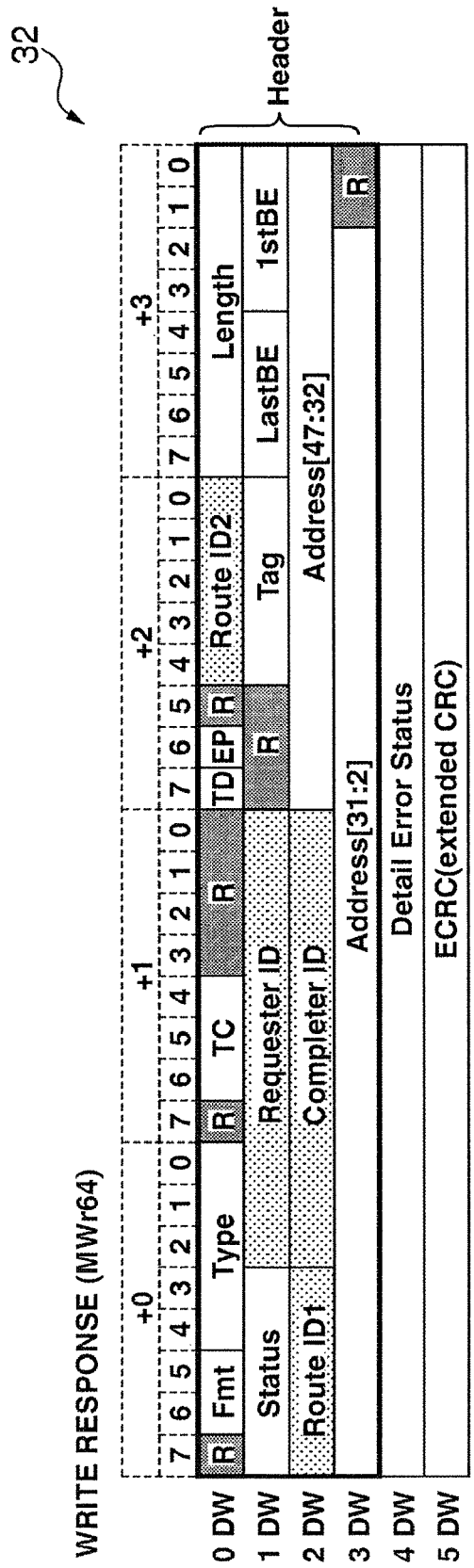
FIG. 9 is an explanatory diagram of a packet format to be used in data transfer in a controller and between controllers.
Figure 10:
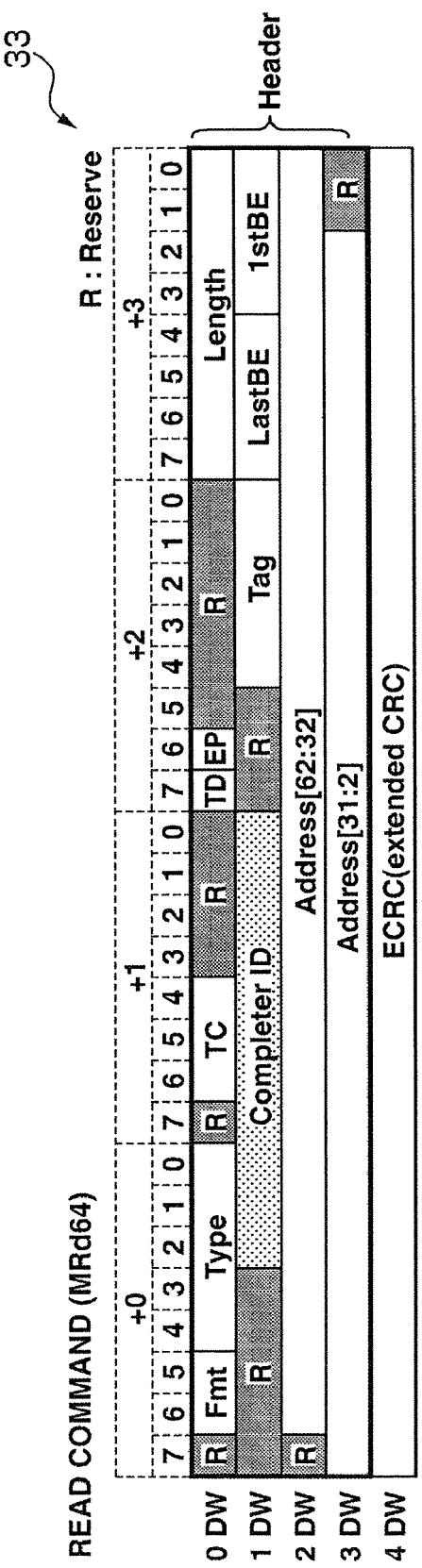
FIG. 10 is an explanatory diagram of a packet format to be used in data transfer in a controller and between controllers.
Figure 11:
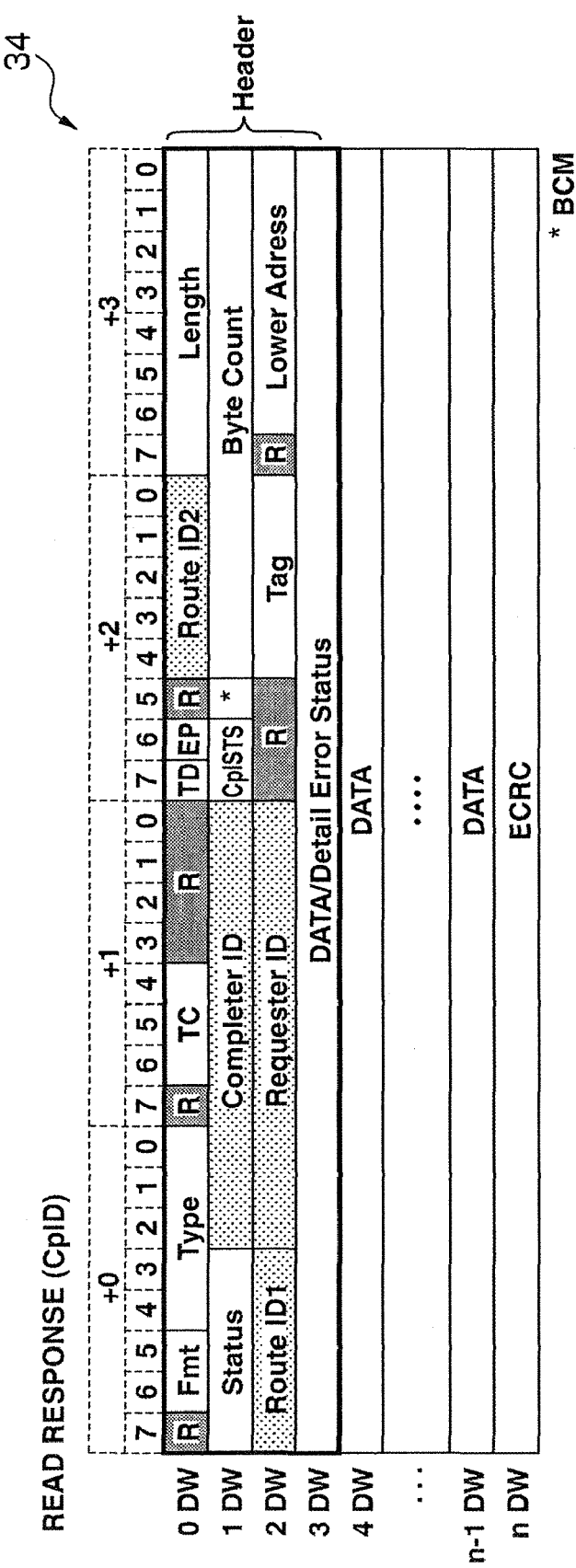
FIG. 11 is an explanatory diagram of a packet format to be used in data transfer in a controller and between controllers.

FIG. 8 shows a write command 31 from the transfer source, which is configured from a header portion and write data. FIG. 9 is a reply packet (write reply 32) requiring the status reply to the write command 31, and is configured from a header and error status. FIG. 10 shows a read command 33, and is configured only from a header. FIG. 11 is a read reply 34 (completion) to the read command, and is configured from a header and transfer data from the transfer source (completer).

FIG. 12 shows the portion optimized for the TLP transfer in the controller 1 or between the controllers 1. In FIG. 12, the TLP format (31 to 34) is assigned, as information to be included in the complete ID and the requester ID, an LSI number for identifying the controller to which the completer or the requester belongs, and a Func. (Function) number for identifying the requester or the I/O to which the requester is to be connected. Moreover, the TLP format (31 to 34) is assigned a route ID1 and a route ID2 for identifying the routing controller between the controllers 1 to which the requester and the completer respectively belong for the purpose of selecting to the diagonal path (xfer3) in FIG. 6. The completer ID, the requester ID, the route ID1 and the route ID2 are assigned by the microprocessor 5.

The route ID1 is assigned a controller number (0 to 3) of the controllers 1a to 1d. Nevertheless, a code value other than 0 to 3 for identifying the respective paths such as the transfer path (xfer 0-2) of FIG. 6 and the transfer path (xfer 0-3) of FIG. 7 is invalid; that is, there is no routing controller 1. The route ID2 defines the transfer source of the data in the routing controller 1; that is, it defines the input I/O (dual I/O or cross I/O) to the controller 1. Contrarily, the route ID2 may define the transfer destination; that is, the output I/O from the controller 1. A tag (Tag) number is used identifying a reply packet to the requester request when taking over all tag numbers contained in the TLP with all read replies 34 in response to a certain read command.

FIG. 8 to FIG. 12 are all compliant with the TLP format of PCI Express, and explanation regarding the respective bits configuring the header is omitted.

The TLP header explained above is not applied to the TLP transfer between the I/Os (Host I/O, Dry I/O, MP I/O) and controller 1. A format that is fully compatible with the TLP of PCI Express is applied to the foregoing TLP transfer to maintain the transfer compatibility. TLP compatibility will be explained with reference to FIG. 13.

Figure 13:
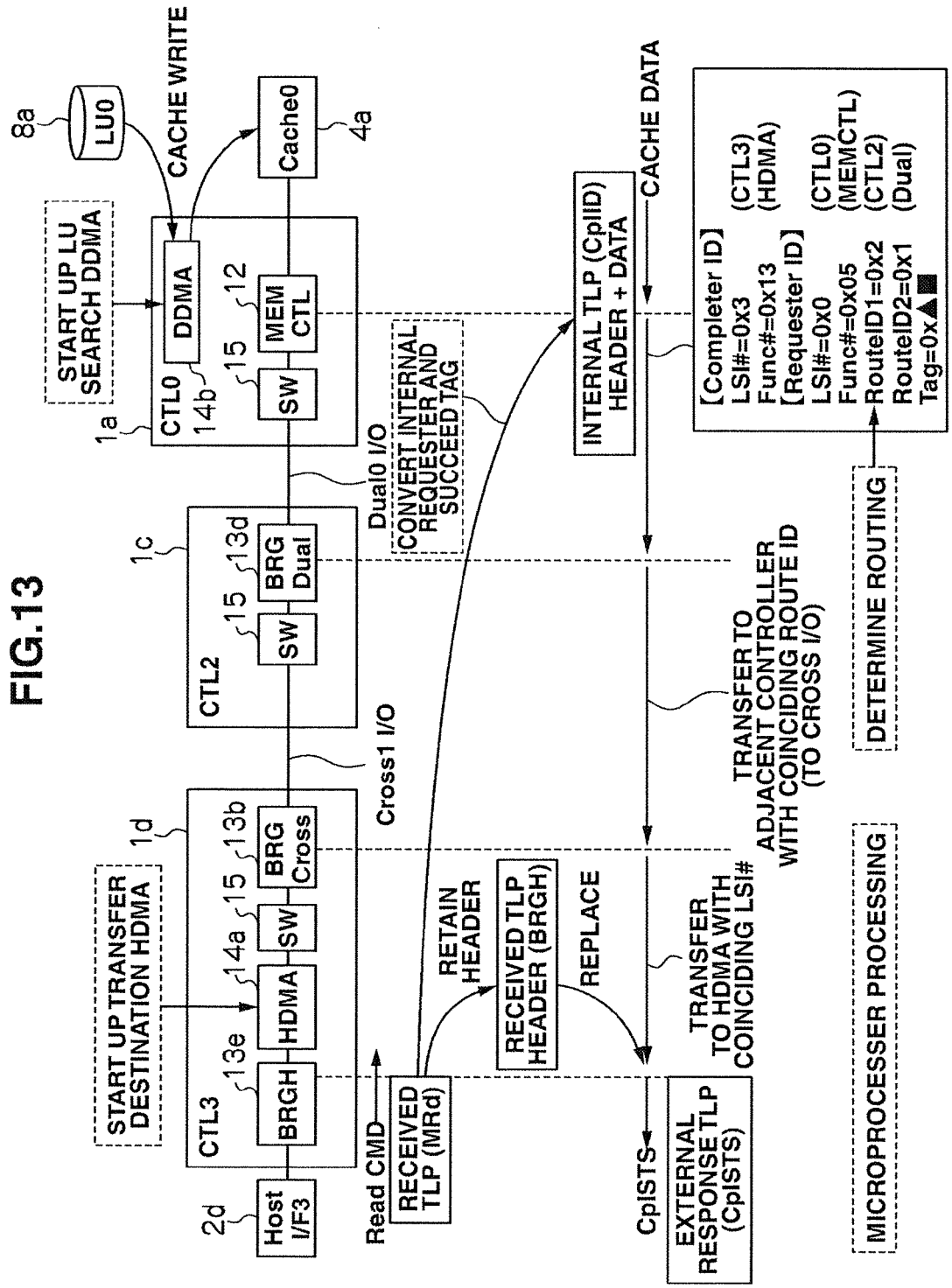
FIG. 13 is an explanatory diagram of a packet data transfer example in a controller and between controllers.

FIG. 13 is a diagram of the data transfer in the controller 1 and between the controllers 1 performed in the TLP format explained with reference to FIG. 8 to FIG. 12, and shows, as one example, a case of application to the transfer path (xfer 3) (transfer via the controller 2) in FIG. 6. In other words, FIG. 13 shows a case where the host interface 2c (Host I/F 3) receives a read command, data of the LU 8a (LU 0) is stored to the cache memory 4a (Cache 0), and cache data is transferred to the host interface 2c via the controller 2b (CTL 2).

In FIG. 13, when the host interface 2c receives a read command, the microprocessor 5b (MP 1) managing the controller 1d analyzes the transfer command from the host interface, and searches for the LU 8 to be reproduced (LU search will be explained later with reference to FIG. 14). Meanwhile, a header is temporarily saved in the bridge circuit 13e (BRG H) of the controller 1d. Header is saved by transferring the header portion from the buffer configuring the bridge circuit 13e to the processor memory 7b.

After the LU search, the microprocessor 5b stores the data of the reproduced LU 8a to the cache memory 4a based on the startup of the DMA circuit 14b (D DMA). Meanwhile, the microprocessor 5b converts the header information of the saved read command into a requester ID corresponding to the I/O that received the read command and the number (3) of the controller 1c. In addition, the microprocessor 5b also transfers the header information to be taken over including the tag number to the memory controller 12 of the controller 1a via the processor memory 7b.

In other words, the microprocessor 5b assigns the number (3) of the controller 1c as the LSI number of the complete ID showing the transfer destination to the completion status (Cpl STS) in response to the read command, and assigns the DMA circuit 14a (HDMA) (0x13) showing the host interface 2 as the transfer destination I/O. The microprocessor 5b also assigns the number (0) of the controller 1a as the LSI number of the requester ID, and assigns the memory controller 12 (0x05) showing the cache as the transfer source I/O. The microprocessor 5b takes over the tag number. Moreover, the microprocessor 5b, based on the routing result, stores the routing controller number and the I/O (Route ID 1-2). In the case of FIG. 13, since this routes the controller 1c, the input in the controller 1c is a dual I/O, and the number (2) of the controller 1c is stored in the route ID1 and the number (0x01) of the dual I/O is stored in the route ID2. Routing will be explained later with reference to FIG. 14 onward.

When the completion status preparation in the controller 1a is complete, the microprocessor 5b starts up the DMA circuit 14a (H DMA) of the transfer destination controller 1c, and controls the cache data transfer in TLP units. The memory controller 12 (MEM CTL) of the controller 1a requests the high-speed switch 15 to transfer data to the transfer destination IO via the route ID1 and the route ID2. The memory controller 12 of the controller 1a requests the transfer to the dual I/O as the transfer destination I/O since the route ID2 is "0x01," and thereby performs the TLP transfer from the controller 1a (CTL 0) to the controller 1c (CTL 2).

In the controller 1c, the bridge circuit 13d (BRG Dual) that received the TLP via the dual 0 I/O detects that the route ID1 is "0x02," detects the coincidence with the self controller number (2), and thereby identifies that it is a routing controller. The bridge circuit 13d recognizes the cross 1 I/O as the I/O between the controllers 1 as the transfer destination I/O based on the foregoing recognition result, that the route ID2 is "0x01" and the input is "dual I/O." Moreover, the bridge circuit 13d requests the high-speed switch 15 to transfer data to the transfer destination I/O (cross 1 I/O), and transfers data to the controller 1d (CTL 3) connected to the cross 1 I/O of the controller 1c.

In the controller 1d, the bridge circuit 13b (BRG Cross) that received the TLP via the cross 1 I/O detects "0x03" as the controller identifying information based on the complete ID. The bridge circuit 13b detects the coincidence with the self controller number, and identifies that it is a reception controller of a completion status. Moreover, the bridge circuit 13b recognizes the host I/O as the transfer destination since the transfer destination I/O is the DMA circuit 14a (H DMA) (0x13). Then the bridge circuit 13b requests the high-speed switch 15 to transfer data to the host I/O, and transfers TLP to the host interface 2d (Host I/F 3). Meanwhile, the bridge circuit 13e (BRG H) compares the tag number retained during the reception of the read command and the tag number assigned to the transfer TLP, switches the header at the time of reception to those that coincide, and converts this into a completion status for external I/O reply.

Based on the above, the transfer between the controllers 1 uses the TLP format of FIG. 8 to FIG. 12, and the transfer between the external I/Os uses the TLP fully compatible with PCI Express by switching the TLP header, when performing the data transfer.

The data transfer control explained in FIG. 6 is now explained with reference to the flowchart of FIG. 14. FIG. 14 shows the control of command reception and search for the reproduced LU the determination of availability of data transfer path, path selection processing, and data transfer. The flowchart of FIG. 14 is realized by the microprocessor 5 controlling the controller 1 and the like. Foremost, the microprocessor 5 receives a transfer command issued by the host from the host interface 2 (S801). Subsequently, the microprocessor 5 controlling the host interface 2 that received the transfer command detects the reception of the transfer command via interruption (MSI) from the host interface 2 or the controller 1. Further, the microprocessor 5 transfers the received transfer command to the processor memory 7 and analyzes the command (S802).

The LU search and cache store processing performed in the range of S803 to S807 are now explained. Subsequently, the microprocessor 5 detects an LU reproduction command after the processing at S802, and searches for the LU 8 managed by the controller 1 of the "self system" (S803). When the LU 8 to be reproduced is detected (S803: Detected), the microprocessor 5 jumps to S806, starts up the DMA circuit 14b (D DMA) of the controller 1 to which the reproduced LU 8 belongs, and stores data of the reproduced LU 8 to the cache memory 4.

Meanwhile, if there is no corresponding LU 8 at S803 (S803: NA), the microprocessor 5 succeeds the processing to the microprocessor 5 of the "other system" (S804). Specifically, the microprocessor 5 transfers the received command in the processor memory 7 of the "self system" to the processor memory 7 of the "other system." The microprocessor 5 of the "other system" searches for the LU 8 managed by itself, detects the reproduced LU (S805), starts up the DMA circuit 14b (D DMA) of the controller 1 to which the reproduced LU 8 belongs, and stores data of the reproduced LU 8 to the cache memory 4 (S806).

In the example of FIG. 6, the microprocessor 5b (MP 1) controlling the host interface 2d (Host I/F 3) that received the transfer command searches for the LU 8a (LU 0) within the range of the managed LU 8c, 8d (LU 2, LU 3). Subsequently, the microprocessor 5b succeeds the processing to the microprocessor 5a (MP 0) since there is no corresponding LU 8a, the searches for the LU 8a within the range of the LU 8a, 8b (LU 0, LU 1) managed by the microprocessor 5a. The microprocessor 5a detects the LU 8a as a result of the search, and controls the storing thereof to the cache memory 4 (Cache 0).

Finally, the microprocessor 5 shares the write completion of the reproduced LU 8 into the cache memory 4 at S807 as a status among the microprocessors 5. The method explained in FIG. 5 is used as the method for sharing the status.

The LU information to be managed by each microprocessors 5 may be shared using a part of the processor memory 7 or the cache memory 4. Thus, the LU search processing (S803 to S805) may also be performed by single microprocessor 5.

Subsequently, after storing the reproduced LU 8 to the cache memory 4, the microprocessor 5 determines the data transfer path availability from the cache memory 4 to the transfer destination (S808). With the transfer path (xfer 0, xfer 1, xfer 2) of the FIG. 6, the optimal path is uniquely decided so as long as there is no failure on the path. Nevertheless, since the transfer path (xfer 3) has the same path length; that is, since the number of controllers 1 to be passed through is the same and there are a plurality of transfer paths, the optimal transfer path can be selected according to the change in the operational status of the respective controllers 1.

Subsequently, during the data transfer path availability determination at S808, the microprocessor 5 shares the information of the controller to which the cache memory 4 stored with data of the reproduced LU 8 and the host interface 2 that received the transfer command respectively belong with the processor memory 7. The microprocessor 5 determines that the transfer path is "xfer 3" since the controllers 1 are not adjacent and are of a diagonal location regarding the cache memory 4a (Cache 0) and the host interface 2d (Host I/F 3), and performs the transfer path selection processing (S808: YES).

Subsequently, the microprocessor 5 sequentially performs the routing determination 1, 2 of S809, S80A, and determines the optimal transfer path based on the controller failure, and multiplicity, traffic volume, and dummy data transfer detection between the controller I/Os (S809, S80A). Upon transferring data, the microprocessor 5 transfers data of the reproduced LU 8 in the cache memory 4 according to the generation method of the completion status (TLP format) and the transfer method based on DMA startup explained with reference to FIG. 8 to FIG. 13 (S80B).

Meanwhile, the microprocessor 5 proceeds to the processing of S80B if the data transfer path selection at S808 is not required (S808: NO) (correspond to FIG. 6 transfer path "xfer 0, xfer 1, xfer2") (S80B). Incidentally, the microprocessor 5 may execute S809 before executing S80B to deal with a failure in the I/O on the data transfer path. Although the microprocessor 5 processed the data transfer selection in this embodiment, other microprocessor might do this process as the same. Finally, the microprocessor 5 performs the routing determination 3 of S80C as processing corresponding to S809 and S80A even during the completion status transfer, and selects the optimal path according to the ever-changing status of the controller 1 (S80C).

Figure 14:
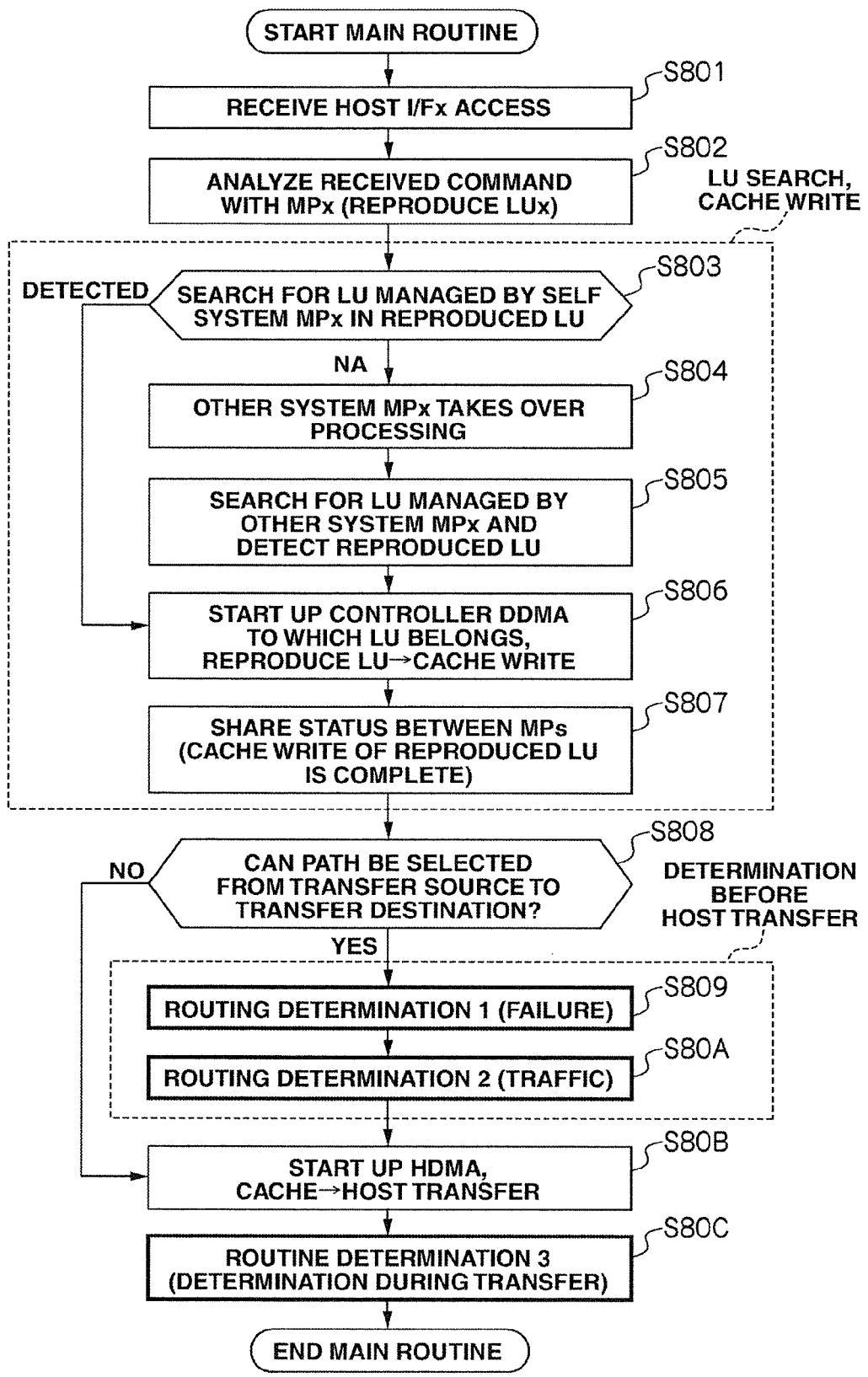
FIG. 14 is a flowchart explaining the main routine of the data transfer method according to the present invention.

As a specific example, a case of applying the transfer path of "xfer 3" in the FIG. 6 to the flowchart of FIG. 14 is now explained. In FIG. 6 and FIG. 14, the microprocessor 5b (MP 1) receives a transfer command from the host interface 2d (Host I/F 3) (S801). Subsequently, the microprocessor 5b transfers the transfer command to the processor memory 7b (MP Mem 1) controlling the host interface 2d.

Subsequently, the microprocessor 5b analyzes the content of the command and detects a reproduced LU 8a (S802). Here, the microprocessor 5b determines that the management LU of the microprocessor 5b is LU 8c, 8d (LU 2, LU 3), and not available (S803: NA). Subsequently, the microprocessor 5b succeeds the processing to the microprocessor 5a (MP 0) of the "other system" (S804).

Subsequently, the microprocessor 5a determines that the management LU of the microprocessor 5a is LU 8a, 8b (LU 0, LU 1), and detects the reproduced LU 8a (S805). Subsequently, the microprocessor 5a starts up the DMA circuit 14b (D DMA) of the controller 1a (CTL 0), and stores the data of the reproduced LU 8a to the cache memory 4a (Cache 0) (S806). Subsequently, the microprocessor 5a shares the store end status of the data of the reproduced LU 8a to the cache memory 4a with the processor memories 7a, 7b (MP Mem 0, MP Mem 1) (S807). Subsequently, the microprocessor 5a determines that the cache memory 4a and the host interface 2d that received the transfer command are of a diagonal location (S808: YES), proceeds to the processing at S809, and selects "xfer 3" as the optimal transfer path (routing determination 1 (S809), routing determination 2 (S80A)). Subsequently, the microprocessor 5a transfers data from the cache memory 4a to the reproduced LU 8a (S80B). Subsequently, the microprocessor 5a constantly selects the optimal transfer path based on S80C (routing determination 3 (S80C)).

Figure 15:
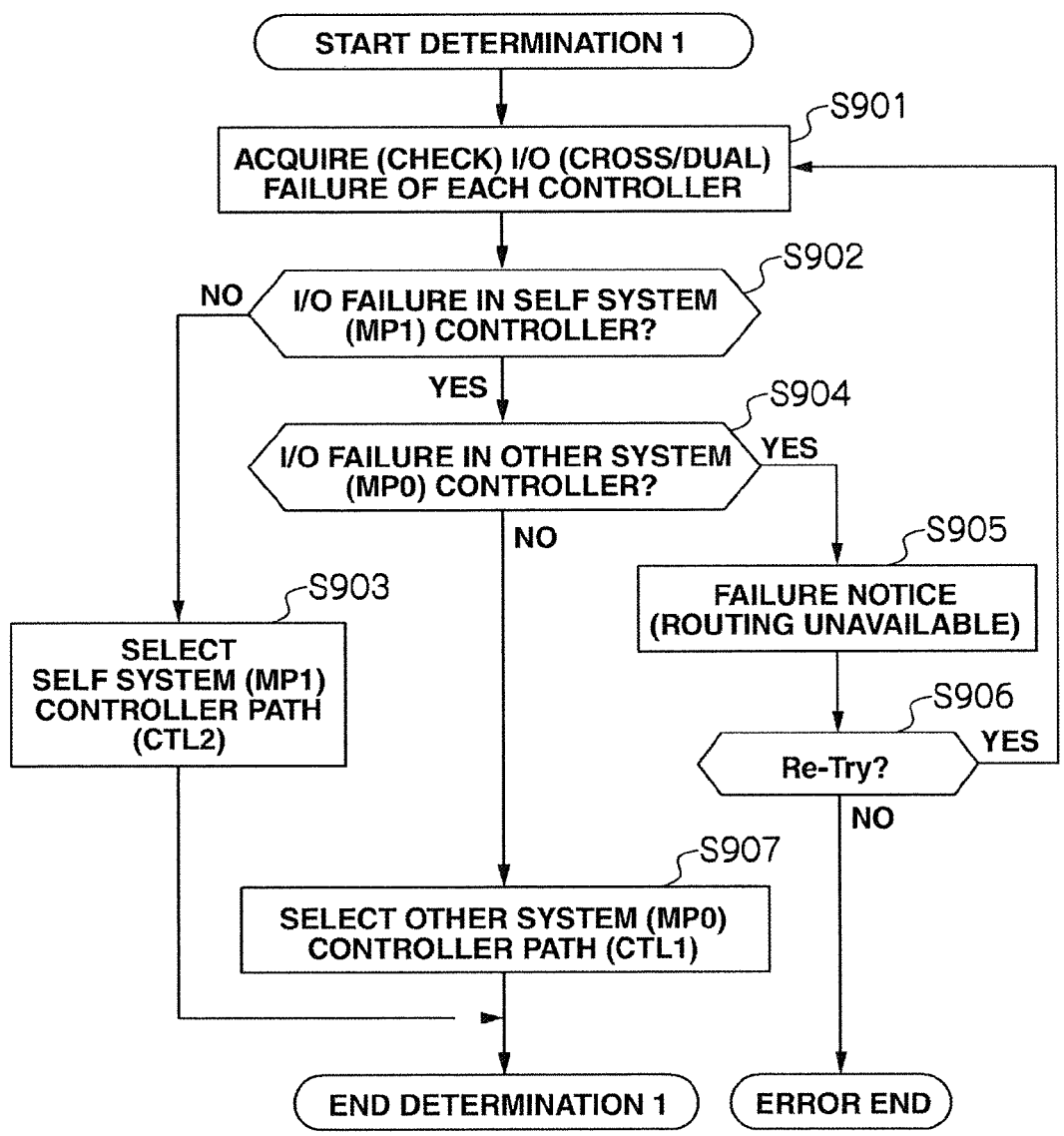
FIG. 15 is a flowchart explaining a routing method to be applied during an occurrence of a controller failure.

The routing determination 1 at S809 is now explained. The flowchart of FIG. 15 shows the path determination method according to the failure status of the controller 1. In particular, this is a determination method according to a failure of the I/O (dual I/O and cross I/O) between the respective controllers deeply related to the path selection. The microprocessor 5, at S901, acquires the failure status of the I/O (dual I/O and cross I/O) between the respective controllers, and shares the failure status of the I/O between all controllers with the writing of data into the respective processor memories. As an example of a failure detection method, considered may be a case where a timeout arises during the reception of the reply packet based on a Non-Posted transfer, or when a communication error is detected between the controllers 1 in the self diagnosis of the I/O to be performed upon the startup of the storage apparatus.

Subsequently, the microprocessor 5, at S902, confirms the I/O failure between controllers in the controller 1 of the "self system" based on the shared failure information. For example, in the case of "xfer 3" of FIG. 6, the microprocessor 4b of the "self system" confirms the I/O failure between the controllers 1c, 1d (dual 0 I/O, cross 1 I/O). Subsequently, if there is no I/O failure between the controllers (S902: NO), the microprocessor 5b of the "self system" selects the routing of the controller 1c (S903).

Thereby, with the storage apparatus 100, the failure management of the selected path of "xfer 3" can be consolidated in the microprocessor 5b controlling the transfer destination host interface 2d. In other words, with the storage apparatus 100, since from the inter-controller I/O of the transfer source I/O to the inter-controller I/O of the transfer destination are managed with a microprocessor 5b, the occurrence of a failure can be grasped promptly. Although sharing a failure with the processor memory 7 can also be considered, a failure in the dual I/O cannot be shared. Thus, the superiority of S902 and S903 should be understood.

Subsequently, if an inter-controller I/O failure occurs at S902 (S902: YES), the microprocessor 5, at S904, confirms the inter-controller I/O failure of the controller 1 of the "other system" (S904). Specifically, at S902, the microprocessor 5b of the "self system" determines the dual 0 I/O, cross 1 I/O, and determines the availability of the routing of the controller 1c (S902). At S904, the microprocessor 5a of the "other system" determines the dual 1 I/O, cross 0 I/O, and determines the availability of the routing of the controller 1b (S904).

If the microprocessor 5 detects a failure at S904 (S904: YES), it determines that it is impossible to have a path (S905). Finally, the microprocessor 5 determines the retry from the S901 (S906). The microprocessor 5 determines the error if the retry count is exceeded or the retry processing is not performed (S906: NO). Meanwhile, if the microprocessor 5 determines that there is no inter-controller I/O failure at S904 (S904: NO), it selects the routing of the controller 1b (S907).

Figure 16:
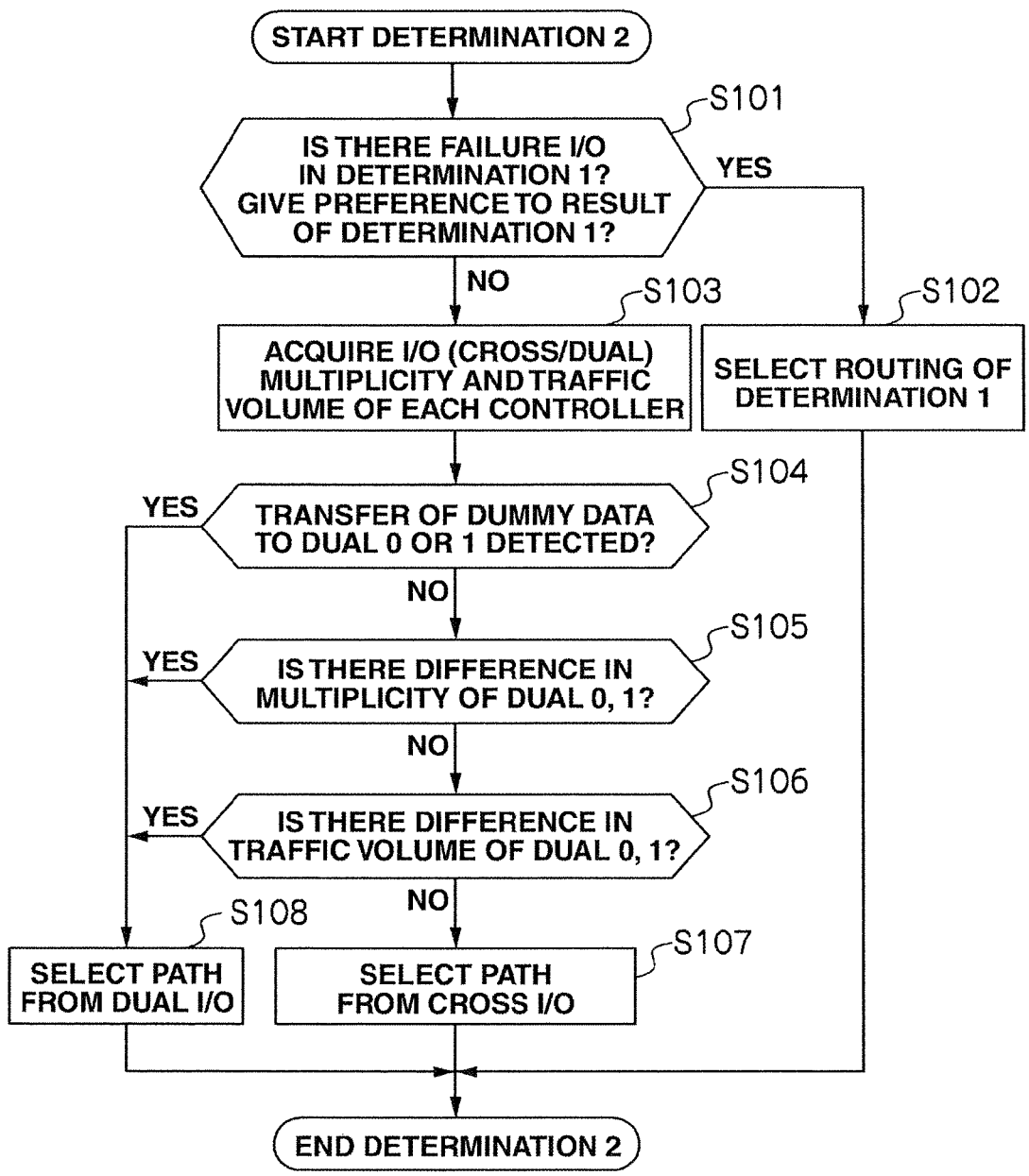
FIG. 16 is a flowchart explaining a method of determining the routing from the respective statuses of packet multiplicity, traffic volume, dummy transfer detection of I/O between controllers.

The routing determination 2 at S80A is now explained. The flowchart of FIG. 16 shows the method of selecting the transfer path based on the detection of multiplicity, traffic volume, and dummy data of the inter-controller I/O explained in FIG. 2 and FIG. 3.

The microprocessor 5, at S101, confirms the existence of an inter-controller I/O failure from the result of the routing determination 1 (S809). If the microprocessor 5 confirms a failed I/O (S101: YES), it determines that path selection is impossible, and sets the result of the routing determination 1 as the final result of the routing determination (S102). If the microprocessor 5 confirms that there is no inter-controller I/O failure and the result of the routing determination 1 (S809) is to be preferentially applied (S101: YES), it also sets the result of the routing determination 1 as the final result (S102). In other words, with the storage apparatus 100, since this corresponds to a case where the path determination at S903 of the routing determination 1 (S809) was performed, in the foregoing case, this is advantageous in the failure management of the transfer path as described above.

Meanwhile, if the microprocessor 5 is to proceed from S101 to S103 (S101: NO), it acquires the status information on the detection of the multiplicity, traffic volume, and dummy data of each inter-controller I/O (dual I/O and cross I/O) (S103). Each information is directly acquired from the sharing to the processor memory 7 and from the MSI.MP I/F register 19 in the controller 1. Subsequently, the microprocessor 5 determines the path from the acquired status information at S104 to S106.

The microprocessor 5 determines the dummy data transfer in the dual I/O as the initial determination condition (S104). Moreover, if the microprocessor 5 detects dummy data transfer at S104 (S104: YES), at S108, it determines the I/O subject to the dummy data transfer (dual 0 I/O or dual 1 I/O), and selects a path to the dual I/O with no dummy data transfer (S108). When applying "xfer 3" of FIG. 6, if the microprocessor 5 detects the dummy data transfer to the dual 0 I/O, it selects routing of the dual 1 I/O; that is, routing of the controller 1b.

If the microprocessor 5 detects the dummy data transfer to both the dual 0 I/O and the dual 1 I/O, it repeats the update and acquisition of the status information, and selects a path of the dual I/O with a low detection frequency. Otherwise, the microprocessor 5 may also entrust the decision to the determination at S105 onward.

Meanwhile, if the microprocessor 5 does not detect a dummy data transfer at S104 (S104: NO), at S105, it compares the packet multiplicity of the dual 0 I/O and the dual 1

I/O (S105). If there is a difference in the multiplicity (S105: YES), the microprocessor 5 proceeds to the processing at S108, and selects a dual I/O with small multiplicity (S108). Thereby, the microprocessor 5 is able to select a path while giving consideration to the influence to the overhead, which arises upon multiplexing with the high-speed switch 15, to the transfer.

Meanwhile, if there is no difference in the multiplicity at S105 (S105: NO), the microprocessor 5, at S106, makes its determination based on the traffic volume of the dual 0 I/O and the dual 1 I/O (S106). If there is a difference in the traffic volume (S106: YES), the microprocessor 5, at S108, selects the dual I/O with a small traffic volume (S108). Thereby, the microprocessor 5 is able to select a transfer path that can be transferred another data transfer sufficiently with the selected dual I/O. Based on the above, the microprocessor 5 gives maximum weighting to S104 (existence of dummy data transfer) regarding the path determination based on dual I/O, and thereafter sequentially gives weighting to S105 (multiplicity difference), and S106 (traffic volume difference). The reason why weighting is given more to S105 than S106 (multiplicity priority) is because the increase in the transfer overhead caused by the multiplexing of packets will deteriorate the transfer efficiency; that is, waste the band of the dual I/O.

Meanwhile, if there is no difference in the traffic volume at S106 (S106: NO), the microprocessor 5 determines the routing of cross 0 I/O or cross 1 I/O from the same status information (multiplicity, traffic volume, etc.) in the cross I/O at S107 (S107). Here, the microprocessor 5 gives weighting of "(multiplicity)>(traffic volume)" as with S105 to S106 regarding the priority of determination at S107.

In addition, since the cross I/O as no processor access or cache dual writing as with the dual I/O, the band will not be wasted. Accordingly, the microprocessor 5 sets "(Dual I/O)> (Cross I/O)" upon selecting the path, and makes its determination by giving weighting to the dual I/O.

Based on the above, the microprocessor 5 is able to optimally select the path of "xfer 3" of FIG. 6 by sequentially performing the routing determination 1 (FIG. 15) and the routing determination 2 (FIG. 16) explained above.

Figure 17:
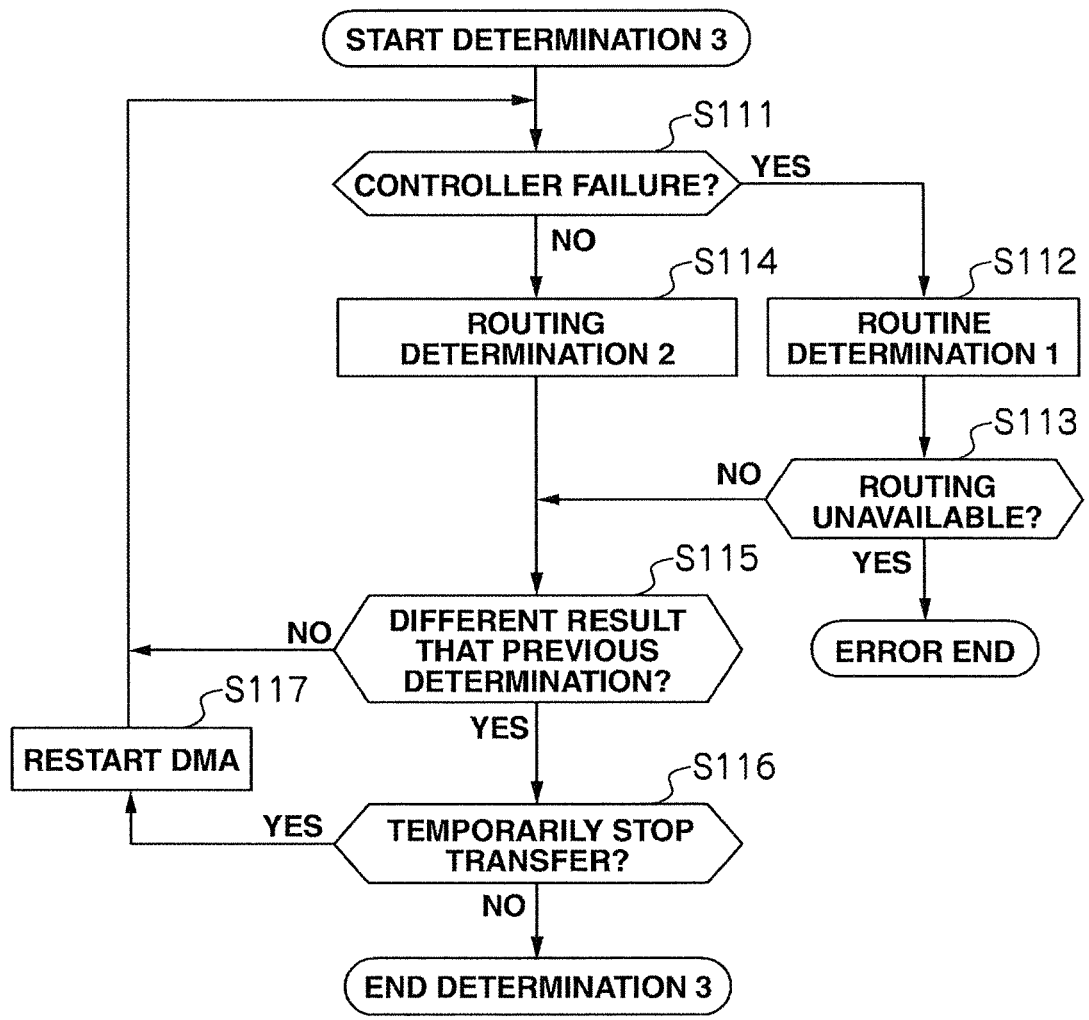
FIG. 17 is a flowchart explaining a method of determining the routing to be performed during the data transfer.

The routing determination 3 of S80C is now explained. The flowchart of FIG. 17 shows the control method in a case where there is change in the status information after the startup of S80B of FIG. 14. The microprocessor 5 starts up the S80B, and thereafter foremost determines the existence of a failure in the dual I/O and cross I/O from the status information to each controller 1 (S111). If there is a failure (S111: YES), the microprocessor 5 performs the routing determination 1 of FIG. 15 (S112). Subsequently, the microprocessor 5 proceeds to S115 if routing that avoids the dual I/O and cross I/O that failed at S113 (S113: NO), and error ends the routine if such routing is impossible (S113: YES).

Meanwhile, if there is no failure at S111 (S111: NO), the microprocessor 5 performs the routing determination 2 of FIG. 16 (S114). Subsequently, the microprocessor 5, at S115, makes a comparison with the previous routine result from the determination of S114 or S112 to S113 (S115).

If there is no difference (S115: NO), the microprocessor 5 proceeds to S111, and continues the subsequent processing (S111 to S115). Meanwhile, if there is a difference (S115: YES), the microprocessor 5 determines whether to temporarily stop the transfer (S116). Upon temporarily stopping the transfer (S116: YES), at S117, the microprocessor 5 temporarily stops the DMA circuit 14, selects a new transfer path by switching the route ID1 and route ID2 in a completion status, and restarts the DMA circuit 14 (S117). Subsequently, if the microprocessor 5 is not to temporarily stop the transfer at S116 (S116: NO), it ends the routing determination 3, and performs the transfer while maintaining the path until the transfer in response to the received command is complete.

Based on the above, the microprocessor 5 is able to optimize the path according to changes in the operational status of the controller 1 even during the transfer.

(2) Second Embodiment

Figure 18:
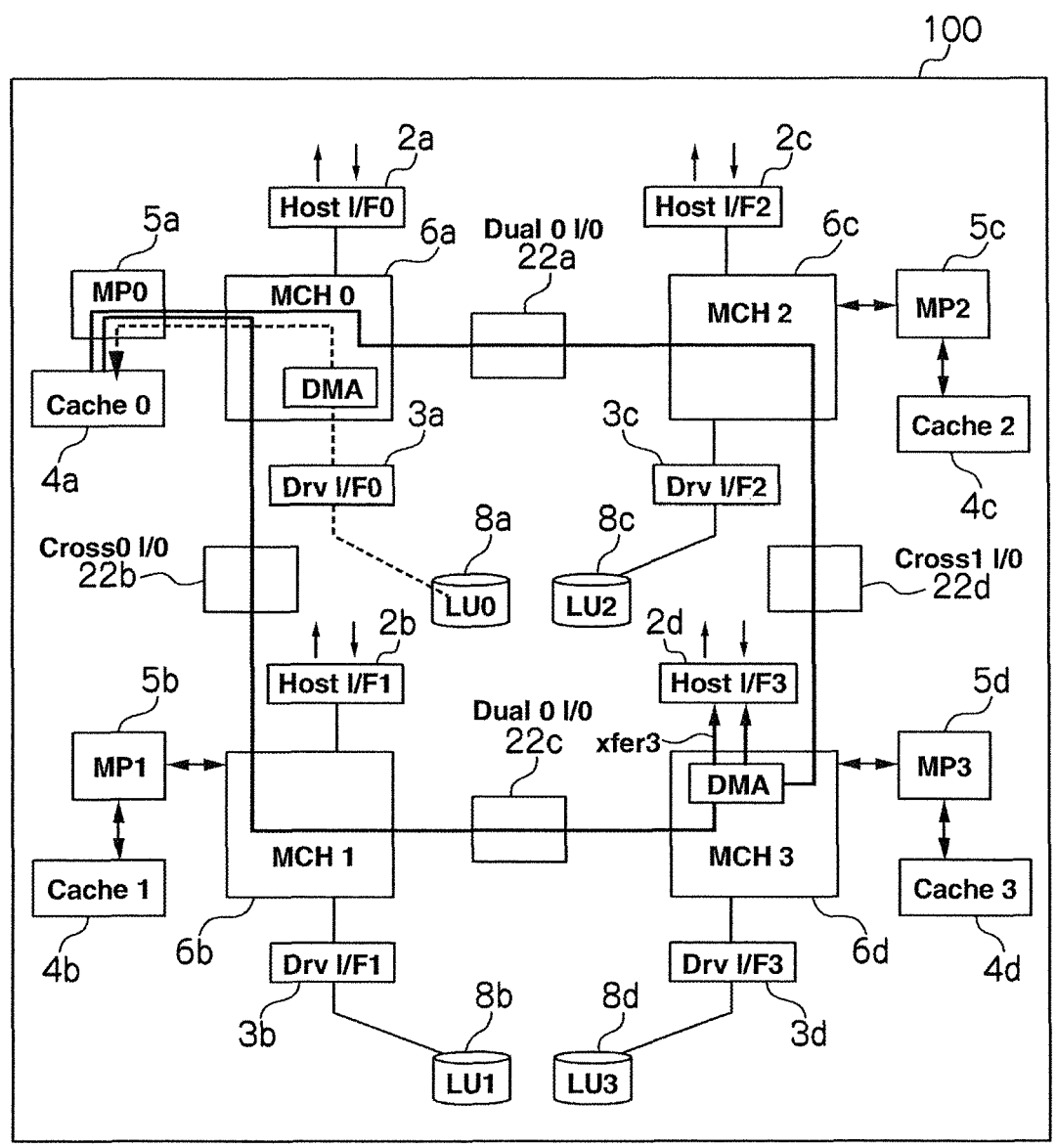
FIG. 18 is a second configuration diagram of a storage apparatus to which the present invention is applied.

FIG. 18 shows another architecture example of the storage apparatus 100 according to the present invention. With the storage apparatus 100 of this embodiment shown in FIG. 18, host interfaces 2a to 2d and drive interfaces 3a to 3d are connected to the memory controller hubs (Memory Controller Hub: MCH) 6a to 6d in substitute for the controllers 1a to 1d in the architecture of the storage apparatus 100 shown in FIG. 1. In addition, microprocessors 5a to 5d are connected to the cache memories 4a to 4d, and the processor memories 7a, 7b (MP Mem) are integrated with the cache memories 4a to 4d. The processor memory 7 is not limited to being integrated, and may also be connected to a different I/O of the microprocessors 5a to 5d.

Moreover, with the storage apparatus 100 of this embodiment, MCH bridges 22a to 22d are provided for the purpose of controlling the TLP transfer between the memory controller hubs 6. Connection between the memory controller hubs 6, as with FIG. 1, is as follows. Namely, the memory controller hub 6a and the memory controller hub 6b are connected with the cross 0 I/O, the memory controller hub 6a and the memory controller hub 6c are connected with the dual 0 I/O, the memory controller hub 6b and the memory controller hub 6d are connected with the dual 1 I/O, and the memory controller hub 6c and the memory controller hub 6d are connected with the cross 1 I/O. Since the remaining configuration of the storage apparatus 100 in this embodiment is the same as FIG. 1, the same components are given the same reference numeral, and the detailed explanation thereof is omitted.

As an example of data transfer in the configuration of this embodiment, FIG. 18 shows the data transfer from the LU 8a to the host interface 2d. This is the same transfer as "xfer 3" of FIG. 6, and shows that there are two transfer paths. Accordingly, as with the first embodiment, it is necessary to select the optimal transfer path.

In this case, as with the first embodiment upon selecting the optimal path, the microprocessor 5 foremost determines an I/O failure between the memory controller hubs 6 to be controlled by each of the microprocessors 5. The microprocessor 5 detects the existence of a failure in the memory controller hub 6 and the I/O between all memory controller hubs based on the MCH bridge 22. The microprocessor 5 selects a path without a failure based on the acquired failure information of the I/O between the memory controller hubs.

Meanwhile, the microprocessor 5 is able to detect the dummy data transfer, I/O multiplicity, and traffic volume explained with reference to FIG. 3 in the first embodiment by providing a similar circuit in the memory controller hub 6. Detection of the traffic volume may also be included in the MCH bridge 22. The microprocessor 5 uses the detection information obtained from the memory controller hub 6 and the MCH bridge 22 to perform path selection according to the method explained with reference to FIG. 16.

The TLP flowing between the memory controller hubs 6 can be subject to packet transfer according to the selected transfer path by using the header configuration of FIG. 8 to FIG. 12. Specifically, the TLP flowing between the memory controller hubs 6 can be handled, as in the first embodiment, by replacing the controller number with the identifying information of the memory controller hub 6 routed through the transfer source and transfer destination, and the identifying information of the I/O to be used in the transfer.

The switching of the packet header explained with reference to FIG. 13 is performed according to the same method in the memory controller hub 6.

The TLP transfer comprising the header configuration of FIG. 8 to FIG. 12 is performed only with the I/O between the memory controller hubs 6. During the transfer to the microprocessor 5, the host interface 2, and the drive interface 3, after the TLP that was transferred between the memory controller hubs 6 arrives, the TLP compatibility is maintained by switching to the header retained during the reception of the transfer command in each I/O.

Like this, with the storage apparatus 100, the microprocessor 5 determines the data transfer path by analyzing the transfer command received from the host. If there are a plurality of data transfer paths, a data transfer path in which the number of controllers 1 connected to the microprocessor 5 becomes maximum is selected regarding the microprocessor 5 controlling the controllers 1 connected to the transfer destination transfer path, and data is transferred via such selected transfer path.

Accordingly, in a storage apparatus of a multi controller architecture comprising a plurality of controllers 1, if a plurality of paths can be selected for the data transfer from the transfer source to the transfer destination, the data transfer path can be appropriately selected, and it is thereby possible to efficiently access the intended data.

The present invention can be broadly applied to storage apparatuses configured from controllers comprising individual I/O units for communicating with the cache memory, the host, and the HDD drive.

What is claimed is:
1. A storage method comprising:
controlling transfer of data between a host system and a storage device using a plurality of controllers connected to the host system and the storage device, where the controllers are interconnected via a data transfer path; and
controlling the controllers using a plurality of processors connected to the controllers,
wherein each of the plurality of controllers is connected to the same or a different processor; and
wherein a first processor connected to a controller that received a transfer command from the host system creates, as header information of a packet of a first controller to become a transfer source:
identifying information of the first controller and a second controller to become a transfer destination,
identifying information of the transfer path between the first controller and the second controller, and
identifying information of a controller which is between first and second controller to be routed upon transferring the data.
2. The storage method according to claim 1,
wherein the first processor retains header information of a packet contained in the data transfer command at a first controller acting as the transfer source; and
wherein, when the second controller receives a packet of the first controller according to header information of a packet of the first controller,
the first processor changes header information of a packet of the first controller to header information of a packet contained in the transfer command retained at the transfer source, and thereafter sends the changed packet to the corresponding connection destination.

* * * * *